United States Patent [19]

Hughes et al.

[11] Patent Number: 5,713,491

[45] Date of Patent: Feb. 3, 1998

[54] POURER FOR POURING LIQUIDS FROM TWO CONTAINERS

[75] Inventors: Martin Hughes, Woburn Sands; Simon Lugg, Islington; Raymond Wright, Hauxton; Paul Robertson, Chrishall; Brian Richard Joy, Sawston, all of Great Britain

[73] Assignee: IDV Operations Ireland Limited, Dublin, Ireland

[21] Appl. No.: 522,934

[22] Filed: Sep. 1, 1995

Related U.S. Application Data

[63] Continuation of Ser. No. 339,685, Nov. 14, 1994, abandoned.

[30] Foreign Application Priority Data

| Nov. 12, 1993 | [IE] | Ireland | 930868 |
| Feb. 8, 1994 | [IE] | Ireland | 940113 |
| Jun. 27, 1994 | [IE] | Ireland | 940524 |

[51] Int. Cl.⁶ .................................................. B67D 5/56
[52] U.S. Cl. ..................... 222/129; 222/481.5; 222/485
[58] Field of Search .................. 222/94, 129, 145.1, 222/478, 479, 484, 485, 481.5

[56] References Cited

U.S. PATENT DOCUMENTS

| 825,680 | 7/1906 | Raymond | 222/129 X |
| 2,308,657 | 1/1943 | Jacobs | 222/129 X |
| 2,661,870 | 12/1953 | Huenergardt | 222/129 |
| 2,661,871 | 12/1953 | Huenergardt | 222/129 |
| 2,812,120 | 11/1957 | Beall, Jr. | 222/481.5 |
| 3,347,420 | 10/1967 | Donoghue | 222/129 |
| 3,407,976 | 10/1968 | Homma | 222/485 |
| 3,727,800 | 4/1973 | Santos | 222/129 |
| 3,729,553 | 4/1973 | Gold et al. | 222/94 X |
| 3,851,800 | 12/1974 | Swain | 222/481.5 X |
| 4,585,150 | 4/1986 | Beacham et al. | 222/481.5 X |
| 4,756,442 | 7/1988 | Hahn et al. | 222/129 X |
| 4,765,514 | 8/1988 | Berglund | 222/145 |
| 4,993,595 | 2/1991 | Bertram et al. | 222/145 X |
| 5,052,590 | 10/1991 | Ratcliff | 222/129 X |
| 5,143,261 | 9/1992 | Drobish | 222/129 |
| 5,154,917 | 10/1992 | Ibrahim et al. | 222/129 X |
| 5,289,950 | 3/1994 | Gentile | 222/129 |
| 5,346,097 | 9/1994 | Melland et al. | 222/132 |

FOREIGN PATENT DOCUMENTS

| 742 344 | 4/1947 | Belgium. |
| 520561 | 6/1953 | Belgium. |
| 0 306 458 | 3/1989 | European Pat. Off. |
| 621200 | 10/1994 | European Pat. Off. ............... 222/484 |
| 0653361 | 5/1995 | European Pat. Off. |
| 423055 | 4/1911 | France. |
| 1128848 | 1/1957 | France. |
| 2 443 197 | 7/1980 | France. |
| 1293051 | 4/1969 | Germany. |
| 3919455 | 12/1989 | Germany ............................. 222/481.5 |
| 103769 | 2/1917 | United Kingdom. |
| 1101196 | 1/1968 | United Kingdom. |
| 1349530 | 4/1974 | United Kingdom. |
| 2001610 | 2/1979 | United Kingdom. |
| 91/04923 | 4/1991 | WIPO. |
| 91/08979 | 6/1991 | WIPO. |

*Primary Examiner*—Kevin P. Shaver
*Attorney, Agent, or Firm*—Jacobson, Price, Holman & Stern, PLLC

[57] ABSTRACT

A pourer which may be used for concurrently pouring dark and white liqueurs from adjacent containers of a bottle. The pourer has a main pourer body with pourer body sections which is engagable, for example by snap fitting, with the respective container. Each pourer body section has a liquid passageway which extends from a liquid inlet to a pouring outlet. The liquid passageways include upstanding portions extending into the containers and separate upper bend portions leading to the outlets. The angle between the longitudinal axes of the outlets is approximately 120° for concurrent pouring of the liquids to opposite sides of a glass. Separate air passageways extend from air inlet parts to air outlets. The air flow is controlled by an air pot over each outlet. The air pots are sized and positioned so that fluid does not enter the air passageways on pouring and only air is forced up the air passageways on finishing pouring.

39 Claims, 20 Drawing Sheets

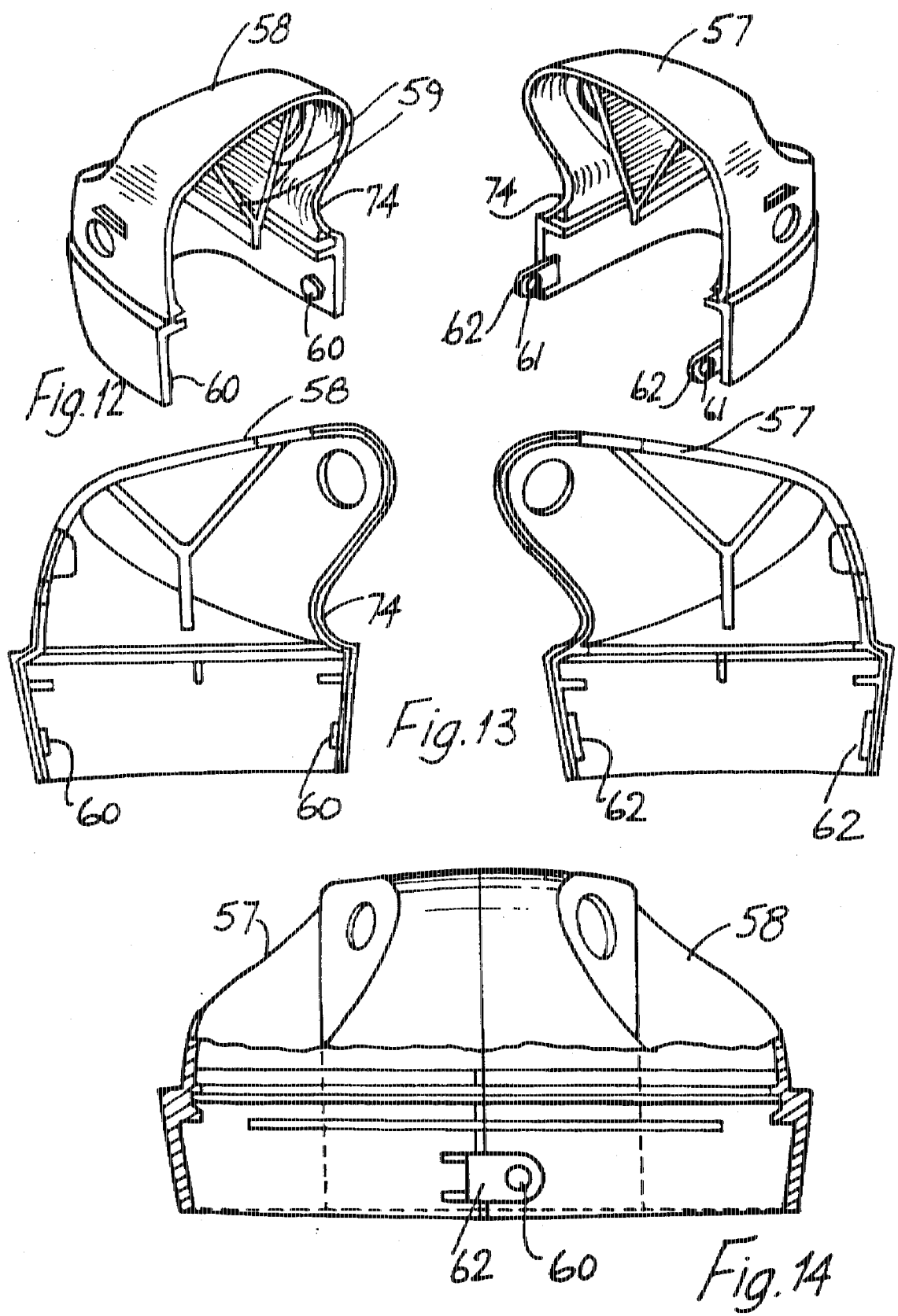

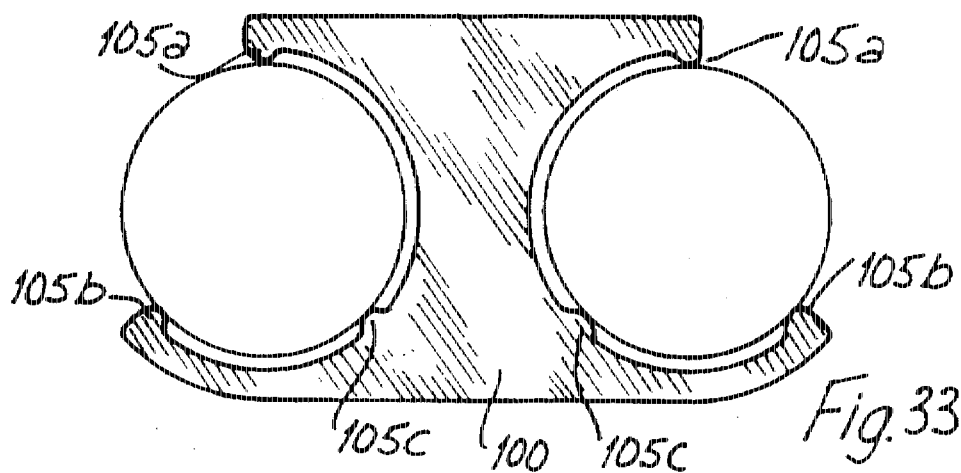
Fig. 33
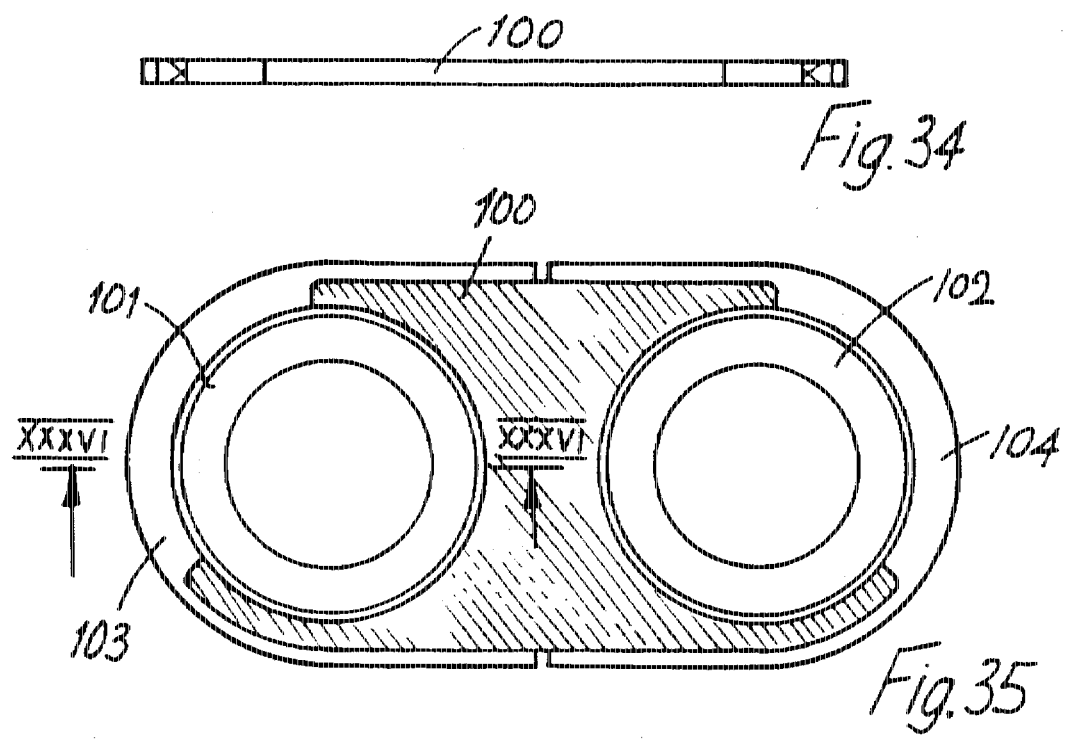
Fig. 34
Fig. 35
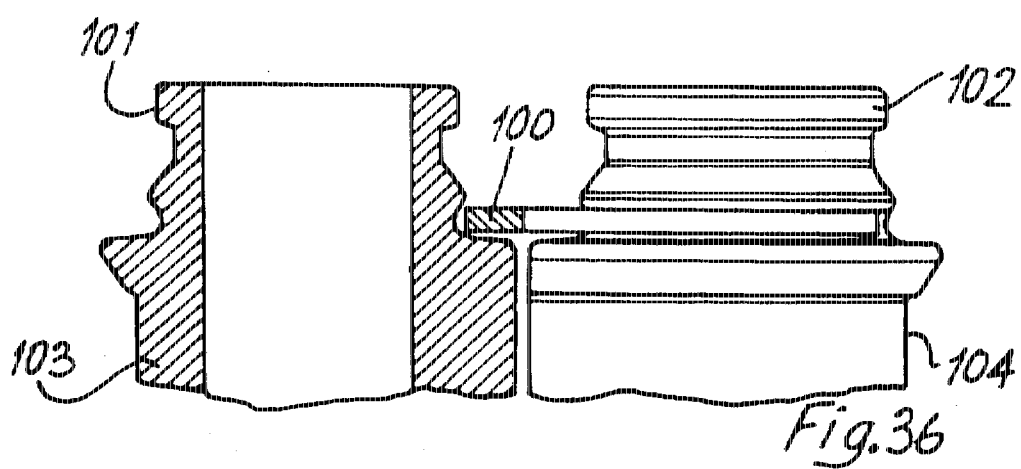
Fig. 36

POURER FOR POURING LIQUIDS FROM TWO CONTAINERS

This is a continuation of application Ser. No. 08/339,685, filed Nov. 14, 1994, now abandoned.

INTRODUCTION

The invention relates to a pourer and in particular to a pourer for pouring liquids such as alcoholic beverage liqueurs and the like from two or more containers.

A new liqueur product has recently been introduced which is provided in a single container having two sub-containers, one for each liqueur. One of the liqueurs is white coloured cream liqueur and the other is a dark coloured coffee liqueur. It is intended that a user pours the dark liqueur from one of the sub-containers into a glass and the white liqueur is then poured down the sidewall of the glass to lie on top of the dark liqueur and present an aesthetically pleasing and pleasant tasting liqueur drink. Conventionally, the sub-containers are closed by separate stoppers which are removed as required for pouring a desired liqueur from its sub-container.

This invention is particularly directed towards providing a pourer for pouring from two or more sub-containers of this type.

STATEMENTS OF INVENTION

According to the invention there is provided a pourer for pouring at least two different liquids from containers, the pourer comprising a pourer body section associated with each container, each pourer body section having an air passageway and a pouring passageway, the passageways being arranged for substantially concurrent pouring of the different liquids from the containers.

One of the advantages of the invention is in providing a pourer which allows two different liquids to be poured simultaneously.

In a preferred body of the invention the pouring passageways are arranged for substantially concurrent pouring of the liquids into a receptacle such as a glass.

In a particularly preferred embodiment of the invention, the passageways are arranged for substantially concurrent pouring of the liquids to different locations in a receptacle.

The pouring of the separate liquids to different locations in a glass allows the liquids to be concurrently poured without substantial mixing. Thus, the liquids are allowed to separate to form a layered beverage.

In a particularly preferred arrangement the passageways are arranged for substantially concurrent pouring of the liquids to opposite sides of a receptacle.

Preferably, the angle between the axes of adjacent liquid outlets is at least 90°, most preferably approximately 120°. This is the preferred angle at which the liquids can be poured concurrently while avoiding substantial mixing.

In a preferred embodiment of the invention the liquid passageway outlets are at substantially the same level.

In a preferred embodiment of the invention, the air vent is offset from the associated liquid outlet. The offset between the fluid outlet and air vent facilitates free flow of liquid on pouring.

In a preferred arrangement, the air vent is located above the associated liquid outlet in the pouring position.

This feature assists in preventing liquid entering the air passageway on pouring and facilitates replacement of the liquid dispensed from the container with air.

In one embodiment of the invention, the air passageway includes a lower leg for extending into a container and an upper leg which is offset from the lower leg. Preferably, the upper leg extends substantially at right angles to the lower leg. This arrangement facilitates the desired advantageous positioning of the air vent offset from and above the liquid outlet.

In a particularly preferred embodiment of the invention, the air passageway includes a constriction means to substantially prevent the flow of liquid through the air passageway. This constriction to prevent the flow of liquid through the air passageway may be provided, for example, at the transition between the lower and upper legs of the air passageway.

In one embodiment of the invention, the lower leg includes an end portion, for example, in the form of a scarf portion to promote the flow of liquid from the inside of the air passageway back into a container when a container is up-righted after pouring. This feature also prevents a bubble film forming across the aperture/tube bore due to surface tension effects.

In an especially preferred embodiment of the invention, an air flow management means is provided at the outlet of the air passageway to promote the formation of air bubbles during pouring and to substantially retain air at the outlet on finishing pouring to substantially prevent liquid passing through the air passageway on finishing pouring.

Such an air flow management means has been found to be particularly advantageous in managing the flow of air and indeed the flow of liquid during operation of the pourer.

In a preferred embodiment of the invention the air flow management means comprises an air pot over the outlet of the air passageway. Preferably the outlet of the air passageway defines, together with the air pot, an air management volume.

Preferably the air pot includes a base wall and a side wall which extends upwardly from the base wall, the base and/or side wall defining together with the outlet of the air passageway, the air management volume. Ideally the air pot includes a location means for receiving the air passageway. Preferably the location means comprises an entry hole in a top wall of the air pot through which the air passageway extends.

It has been found that in the particular case illustrated the air management volume should preferably be from 1 ml to 3 ml, and most preferably approximately 1.6 ml to help promote the formation of air bubbles.

Preferably the air pot includes drain hole to allow liquid to drain from the pot.

In a preferred arrangement the air pot is shaped to provide a lead-in for the pourer on placement on a container.

In one embodiment of the invention, the main pourer body includes a receptacle locating means to locate the pourer in a desired pouring position. The receptacle locating means may, for example, comprise a receptacle rim engaging recess in the pourer body. This feature aids consumer compliance by facilitating correct positioning of the pourer relative to the receptacle.

In an especially preferred embodiment of the invention the pouring passageways are arranged for concurrent pouring of the liquids at a predetermined volume ratio.

In a preferred embodiment of the invention, the pourer passageways and/or outlets are of different cross-sectional areas for concurrent pouring at a predetermined volume ratio. This feature has the advantage of facilitating concurrent pouring of different liquids at desired volumes, for example, at a volume ratio of 2:1.

In a preferred embodiment of the invention each pouring passageway includes an upstand portion which extends from the pourer body section into a container.

Preferably each liquid passageway includes an upper bend portion extending from the upstand portion to an outlet portion.

In a preferred embodiment of the invention the upstand portion is generally elliptical in cross section to provide a smooth transition between the upstand and bend portions.

In one arrangement the angle, in front view, between the longitudinal axis of the bend portion of each passageway and the horizontal is from 40° to 80°, preferably approximately 60°.

In a preferred arrangement the angle, in side view, between the longitudinal axis of the bend portion of each pouring passageway and the horizontal is from 20° to 60°, preferably approximately 40°.

In a preferred embodiment of the invention the angle between the longitudinal axis of the outlet of each liquid passageway and the horizontal is from 2° to 12°, preferably approximately 8°.

In one embodiment of the invention, for particularly good liquid flow on pouring and on uprighting the bore of each liquid pouring passageway gradually increases from the liquid outlet towards the liquid inlet. The bore ideally should gradually increase from the end of the nozzle to the end of the upstand. This ensures that, on completion of pouring, any fluid remaining in the bore is encouraged to fall back into the bottle and not form a slug that could block the fluid path.

In a preferred embodiment of the invention, the pourer includes a sealing cap. This feature not only improves the shelf life of the liquids to be poured, but also reduces the risk of contamination, including cross contamination between the liquids. This feature opens up the possibility of providing a pourer with a cap which is fitted permanently to the containers. In this case of twin fluids with associated air passageways a single cap may be used to seal the passageways.

Preferably, the cap includes a fluid seal for sealing each fluid outlet. This feature maintains the shelf-life of the liquid and also assists in preventing accidental spillage of the liquids, for example, if the containers are inverted.

Preferably also, the cap includes an air seal for sealing each air vent. This similarly assists in maintaining the shelf life of liquids and also in preventing accidental spillage.

In a particularly preferred embodiment of the invention, the cap is arranged to prevent removal of the cap on lifting. The advantage of this feature is in avoiding the cap being accidentally removed from the pourer if the container to which the pourer is fitted is lifted by the cap only.

To achieve this, preferably the cap is at least partially of flexible material and is a push-on fit to the body of the pourer.

Preferably, the sidewall means of the cap is pressed inwardly to release the cap from the pourer. This feature ensures that a user must intentionally decide to remove the cap before the cap becomes disengaged from the pourer body.

Preferably, the cap is configured to roll-on to the pourer body on fitting. The roll-on feature allows for ease of fitting of the cap, while at the same time ensuring that the seals engage with the liquid outlets and air vents. Thus, preferably the fluid seal engages with the fluid outlet either on rolling on or off of the cap into position on the pourer.

In a preferred embodiment of the invention, one or both of the pourer body and cap includes a ramp over which the cap rides on rolling into the closed position on the pourer. This feature ensures positive engagement of the cap in the closed position. Typically, the ramp is provided on the pourer body for ease of operation.

In a preferred arrangement, the ramp defines a lead-in for engaging the air seal with the air vent on movement of the cap into the closed position.

In one embodiment of the invention, the cap or pourer body includes a projection for engaging with a complementary recess on the other of the pourer body or cap when the cap is moved to the closed position. This ensures a positive engagement on closure of the cap so that the cap cannot be removed accidentally.

In another aspect of the invention provides a bottle having at least two separate containers for different liquids and having a pourer according to the various aspects of the invention described above.

In one case the bottle and pourer are integral. However, generally it may be more convenient that each container has a neck and the pourer is fitted to the necks of the containers.

In one embodiment of the invention the bottle includes a jig to align the necks of adjacent containers on assembly of the containers so that the surfaces of the container necks presented to the pourer are substantially in a common plane and spaced suitably.

Preferably the jig includes recesses to receive the respective container necks, the jig having lugs which project into the recesses to contact the respective container necks.

In a preferred arrangement there are three lugs associated with each recess to define a three point contact with a respective container neck. Preferably a first lug is located substantially on the centre line of the container neck and a second and third lug are located on the other side of the container neck, the second and third lugs being equiangularly spaced from the centre line of the container neck.

In one embodiment of the invention for ease of fitting each pourer body section includes snap projections to snap fittingly engage a corresponding formation on the container neck.

In this case preferably seal is interposed between each pourer body section and the associated container. Preferably the seal is of a compressible elastomeric material.

DESCRIPTION OF DRAWINGS

The invention will be more clearly understood from the following description thereof, given by way of example only, with reference to the accompanying drawings, in which:

FIG. 6A is a view in the direction of the arrow A in FIG. 6;

FIG. 6B is a view in the direction of the arrow B in FIG. 6;

FIG. 12 is a perspective view of cover parts forming part of the pourer according to the invention;

FIG. 13 shows elevational views of the cover parts of FIG. 12;

FIG. 14 is a front, partially cross-sectional view of the cover parts assembled;

FIG. 33 is a plan view of a bottle jig used in association with the pourer of the invention;

FIG. 34 is a side view of the jig of FIG. 33;

FIG. 35 is a plan view of the jig in use;

FIG. 36 is a side, partially cross sectional view on the line XXXVI—XXXVI in FIG. 35;

DETAILED DESCRIPTION

Figure 1:
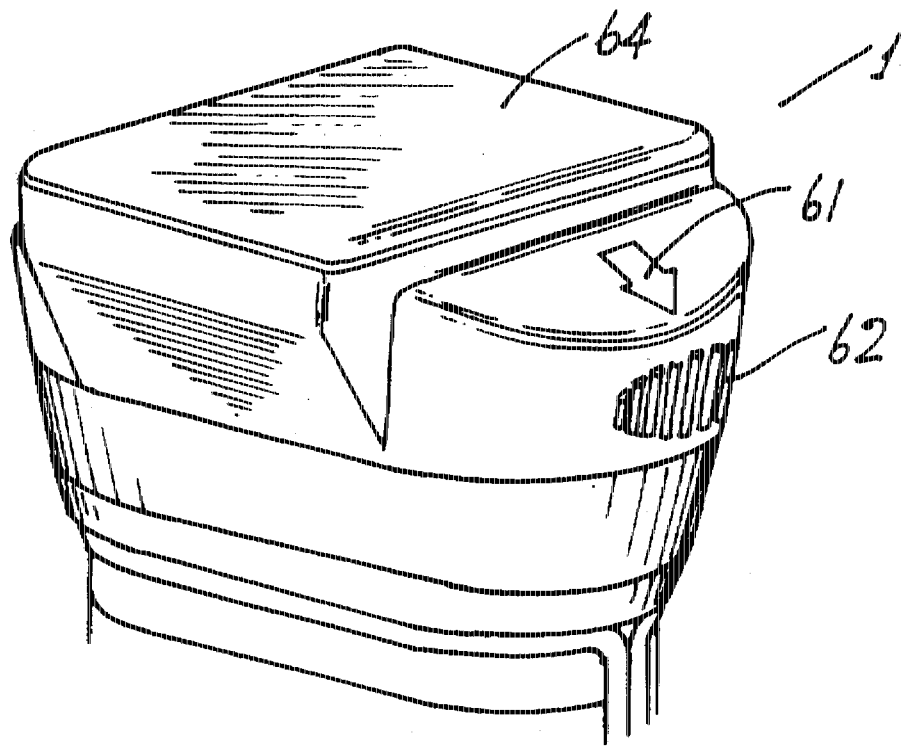
FIG. 1 is a perspective view from the front of a pourer according to the invention.
Figure 2:
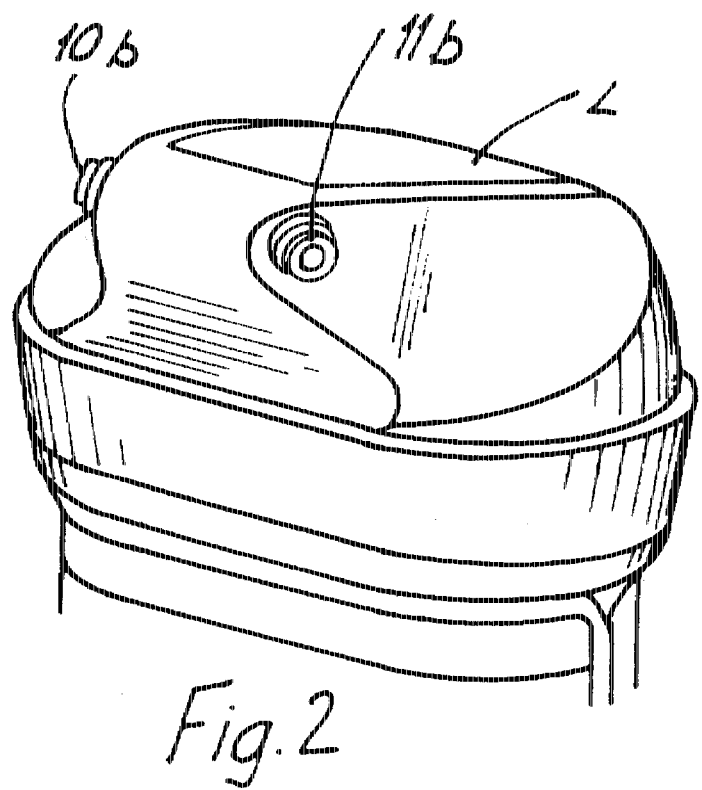
FIG. 2 is a perspective view similar to FIG. 1 with a closure cap removed.
Figure 3:
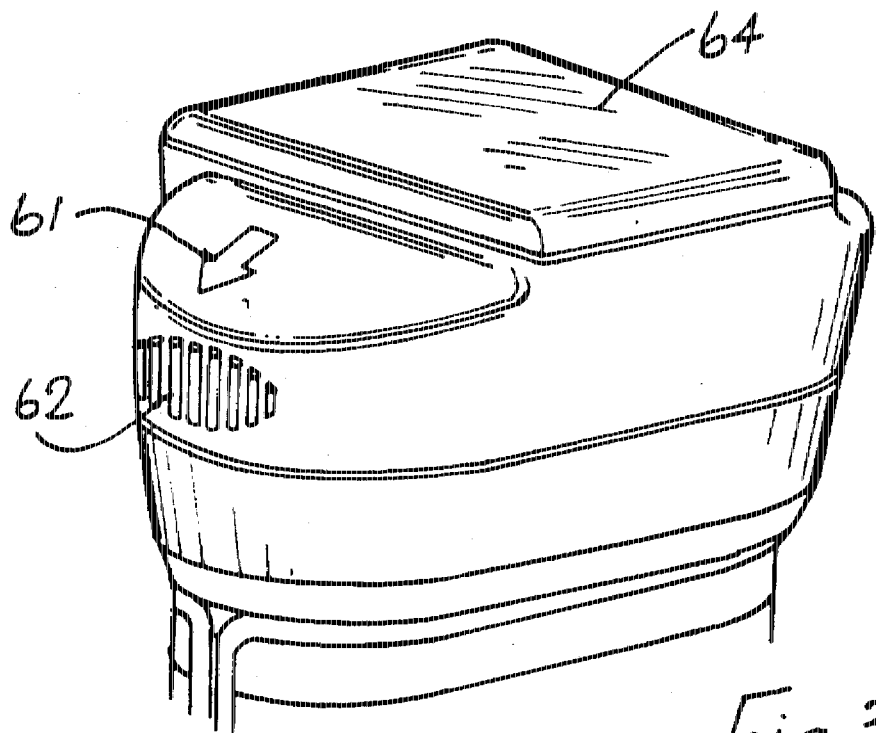
FIG. 3 is a perspective view from the rear of the pourer of FIG. 1.
Figure 4:
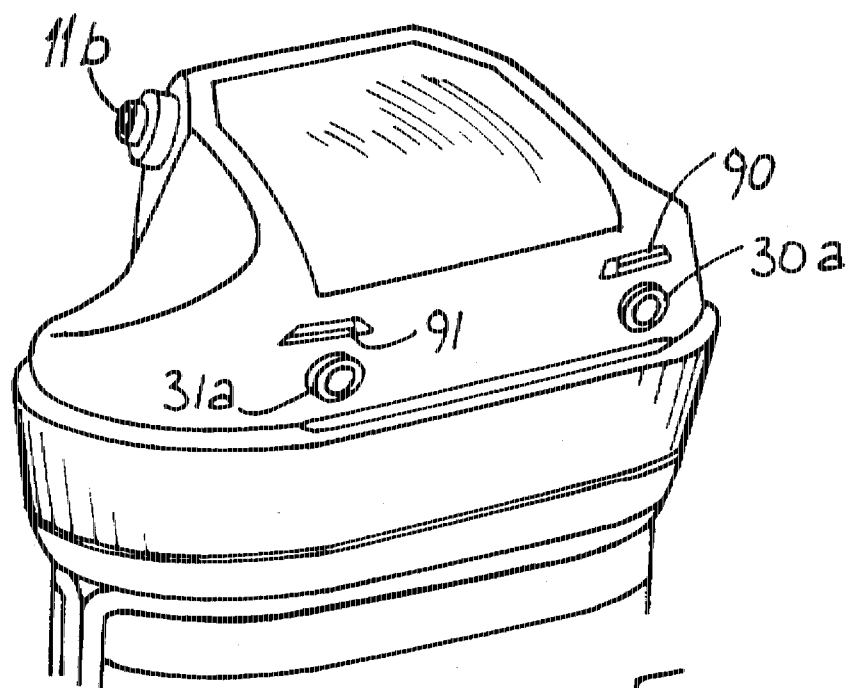
FIG. 4 is a perspective view from the rear of the pourer with the closure cap removed.

Referring to the drawings and initially to FIGS. 1 to 39, there is illustrated a pourer according to the invention and indicated generally by the reference numeral 1 for pouring from two or more containers. In this case, the pourer 1 is used for pouring dark and white liqueurs from a bottle A comprising two adjacent containers B,C having respective outlet necks D,E.

The pourer 1 comprises a main pourer body 2 having a pourer body section 3, 4 associated with each container B,C. Each pourer body section 3, 4 has an engagement means which may be in the form of a depending skirt portion 6 for engaging with an associated container outlet 7 or may snap-fittingly engage the container necks as described in more detail below.

Each pourer body section 3,4 has a pouring passageway 10,11 respectively which extends from a liquid inlet $10a,11a$ from an associated container B,C, to a pouring outlet $10b, 11b$.

The liquid passageways 10,11 comprise upstand portions $10c,11c$ extending in use into a container B,C, and separate upper bend portions $10d$, $11d$ extending from the upstand portions $10c,11c$ to an outlet portion $10e,11e$. The bend portions $10d$, $11d$ and outlet portions $10e,11e$ are formed as one unit and subsequently assembled to the main body section 2 of the pourer as will be particularly apparent from FIGS. 6 to 11. The upstand portions $10c,11c$ are generally elliptical in cross section to provide a smooth transition between the upstand and the bend portions $10d,11d$ which are generally circular in cross section.

Figure 11A:
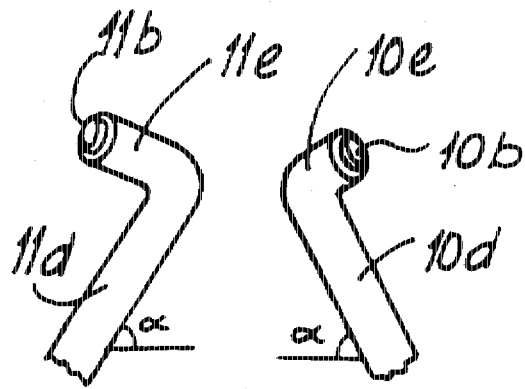
FIG. 11A is a diagrammatic front view of an upper part of the fluid passageways.
Figure 11B:
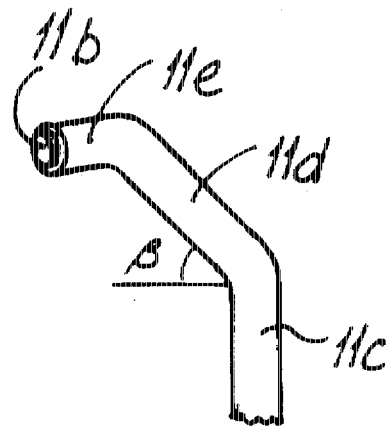
FIG. 11B is a diagrammatic side view of an upper part of one of the fluid passageways.
Figure 11C:
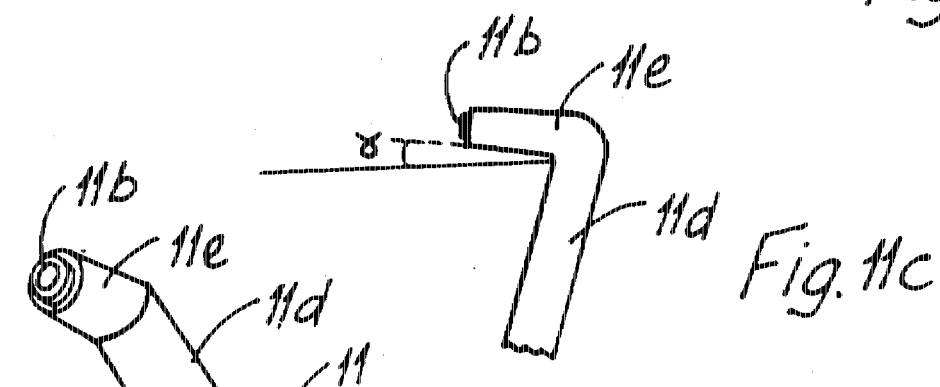
FIG. 11C is a true view of an upper part of one of the fluid passageways.
Figure 11:
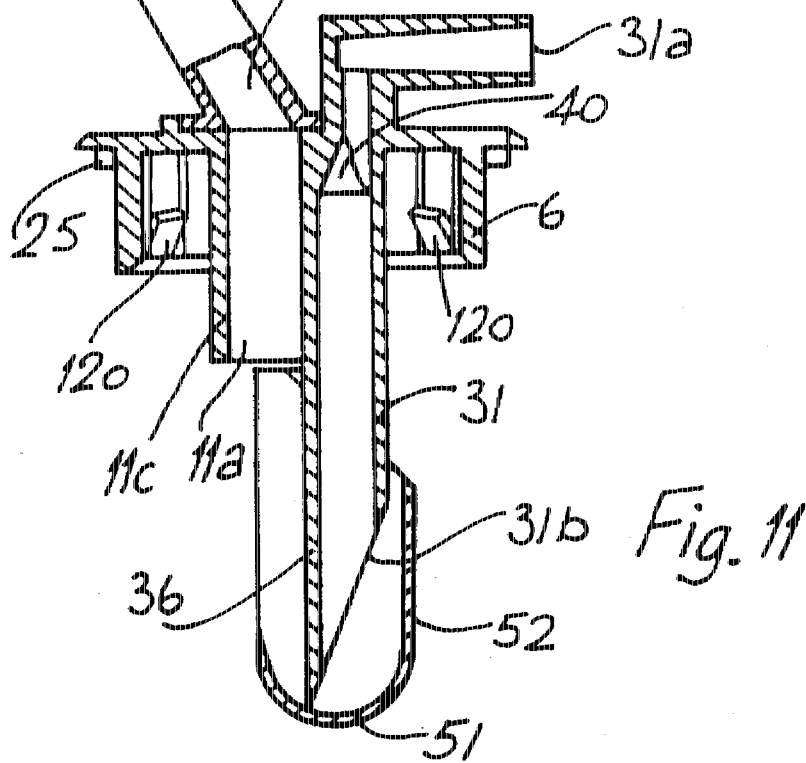
FIG. 11 is a cross-sectional view of the pourer body assembly.
Figure 15:
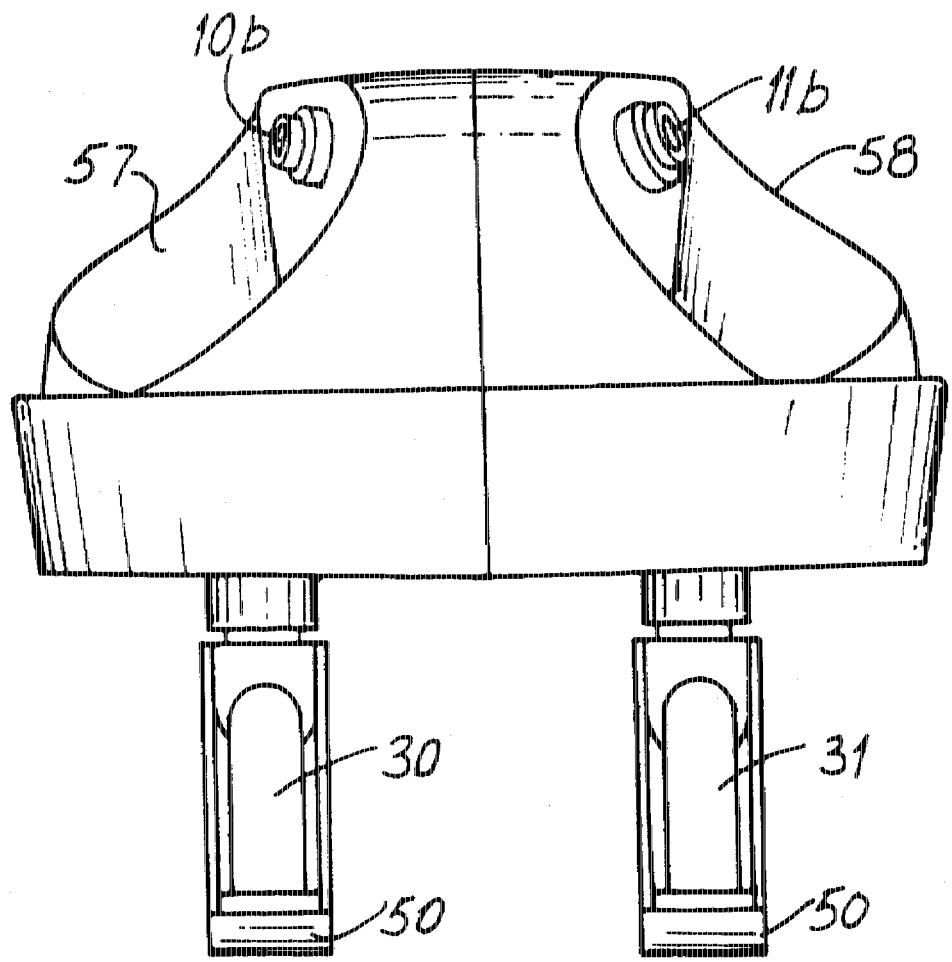
FIG. 15 is a front view of the cover parts in position on the pourer body assembly.
Figure 16:
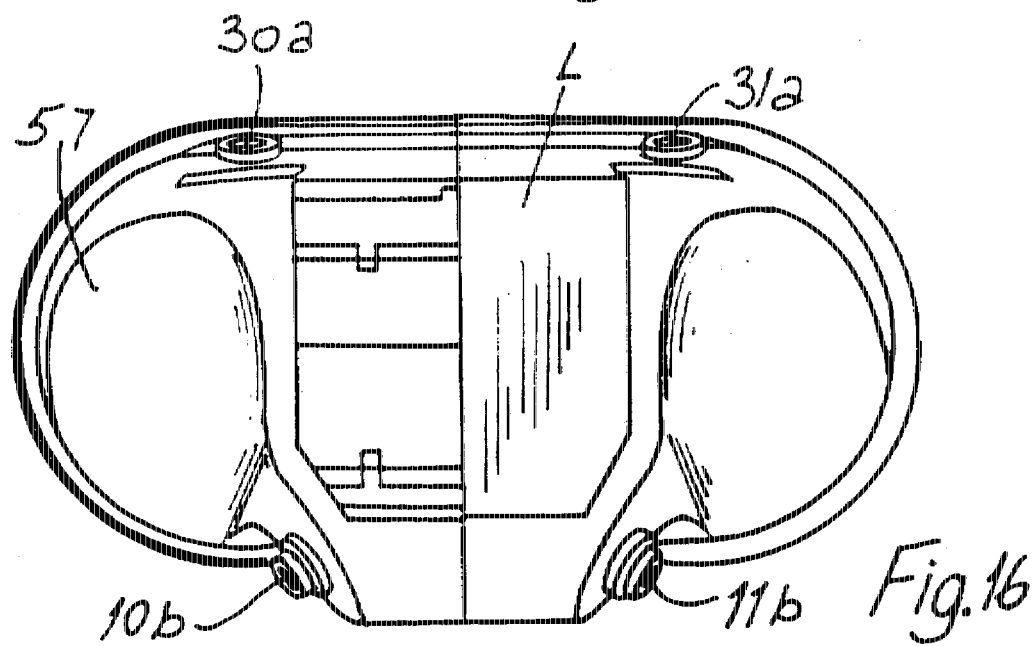
FIG. 16 is a plan view of the covers in position showing a label top.
Figure 18:
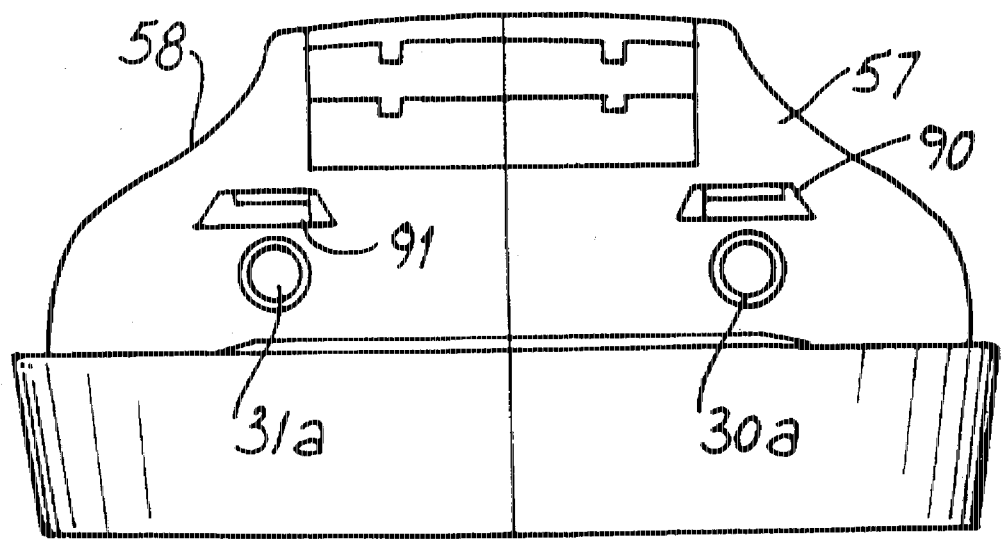
FIG. 18 is a rear view of the pourer body assembly with the cover in position.
Figure 17:
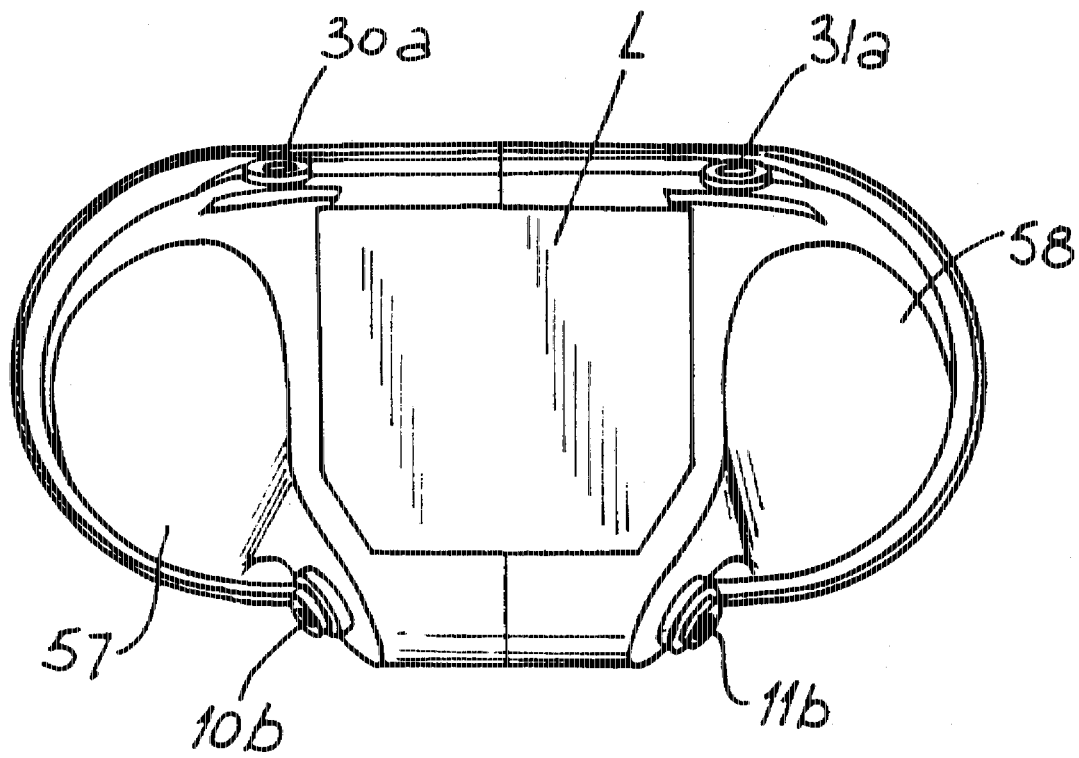
FIG. 17 is a plan view of the covers and label top in position.
Figure 25:
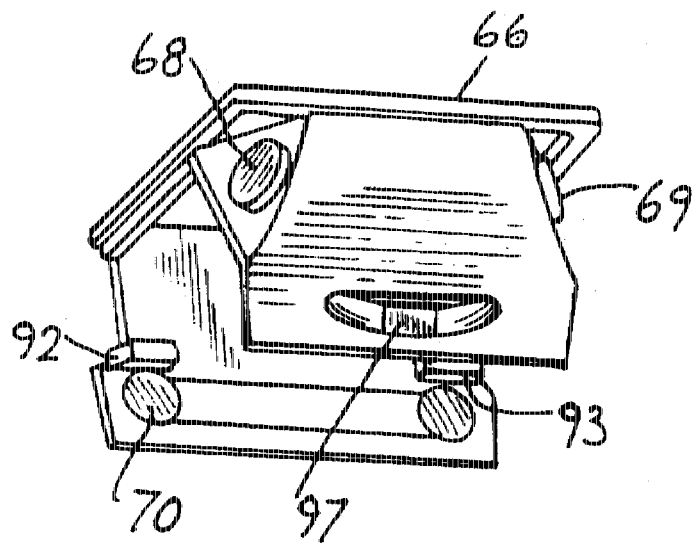
FIGS. 25 and 26 are perspective views from different directions of the sealing cap part of the closure cap.
Figure 21:
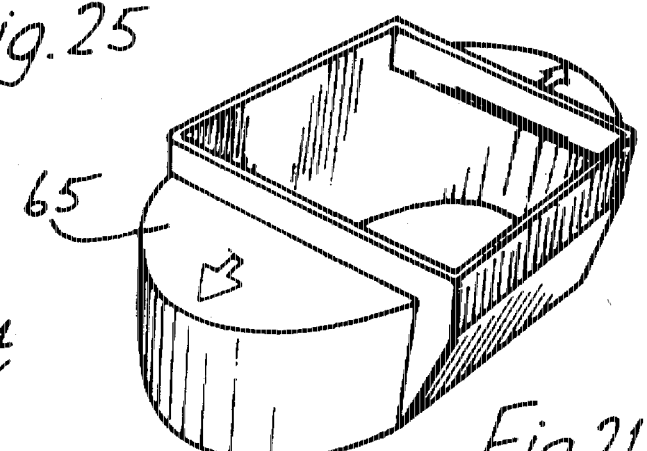
FIG. 21 is a perspective view of the body part of the closure cap.
Figure 19:
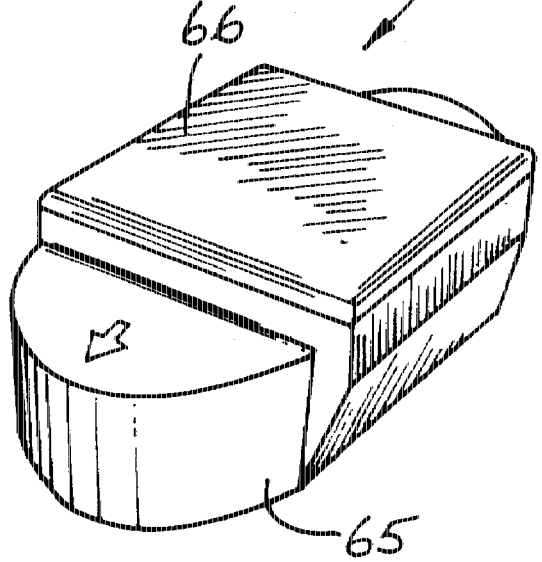
FIG. 19 is a perspective view of a closure cap forming part of the pourer.
Figure 26:
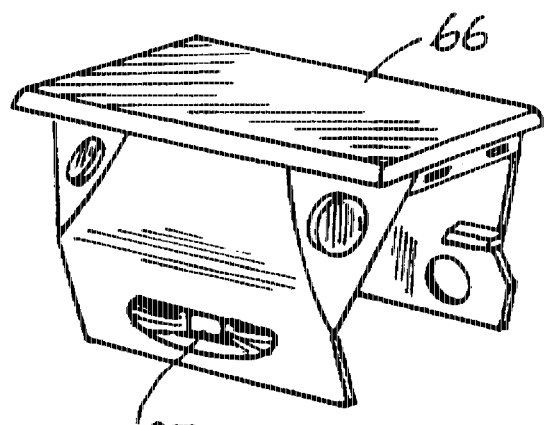
Figure 20:
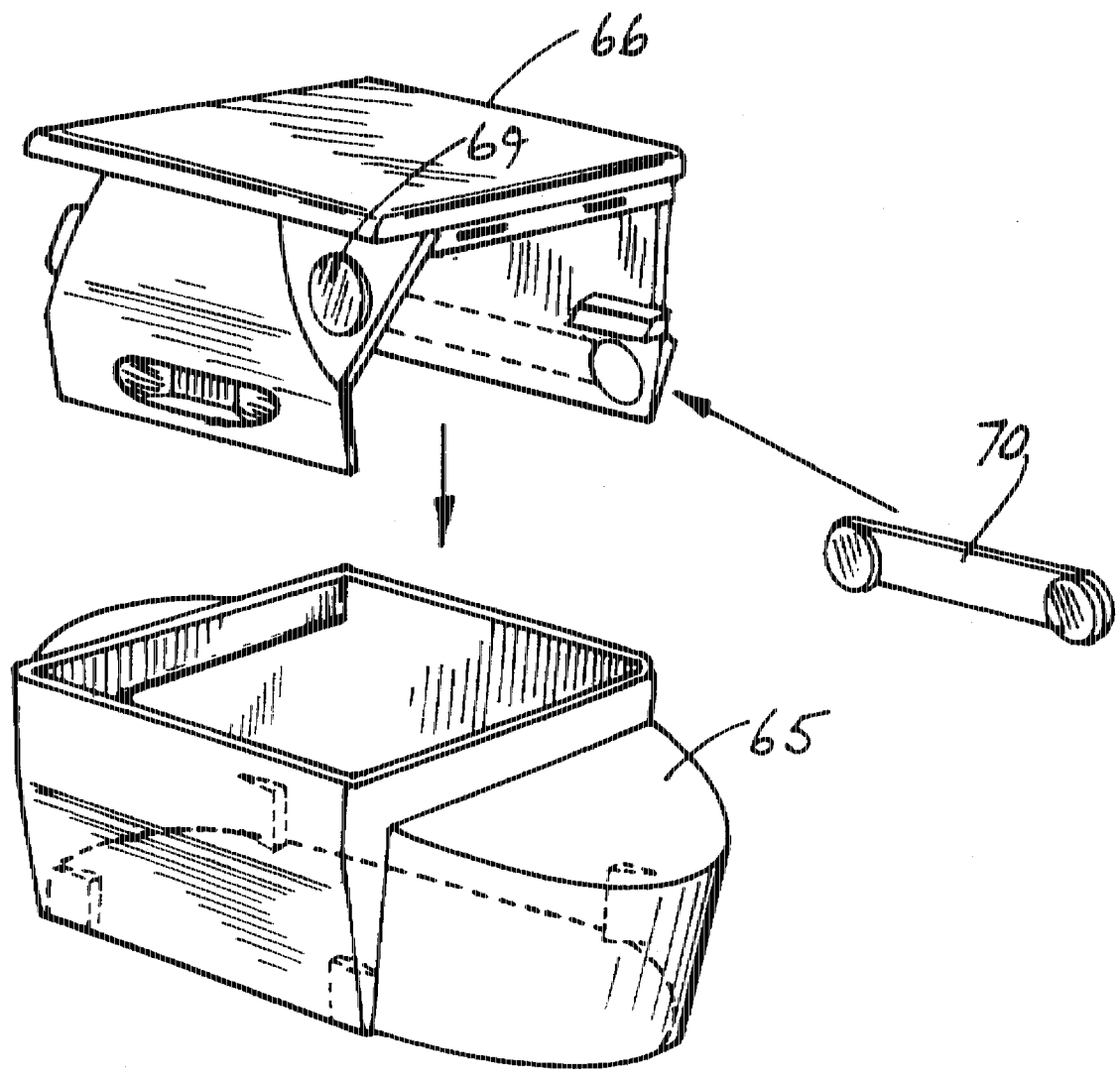
FIG. 20 is an exploded view of a body part and sealing cap parts of the closure cap, excluding nozzle seals.
Figure 22:
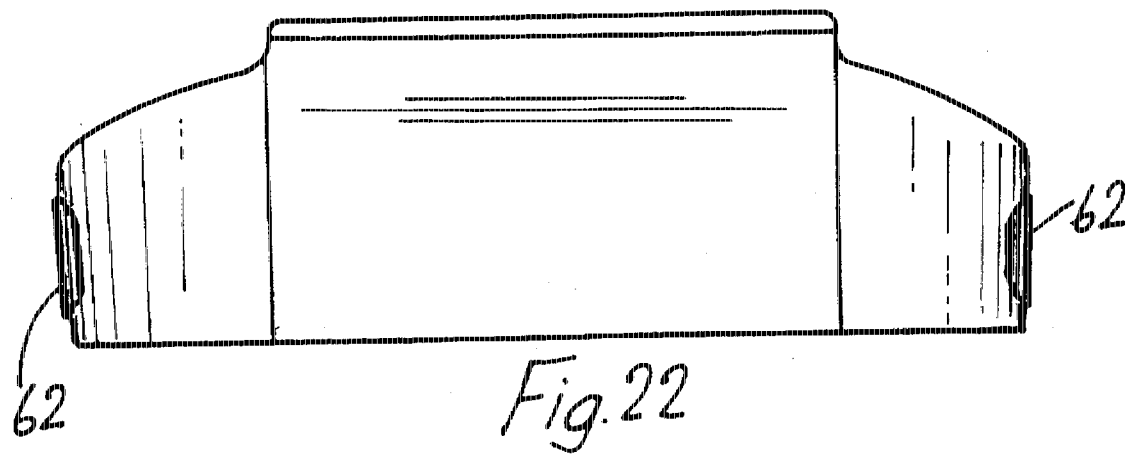
FIGS. 22, 23 and 24 are respectively front elevational, cross-sectional and plan views of the body part of the closure cap.
Figure 23:
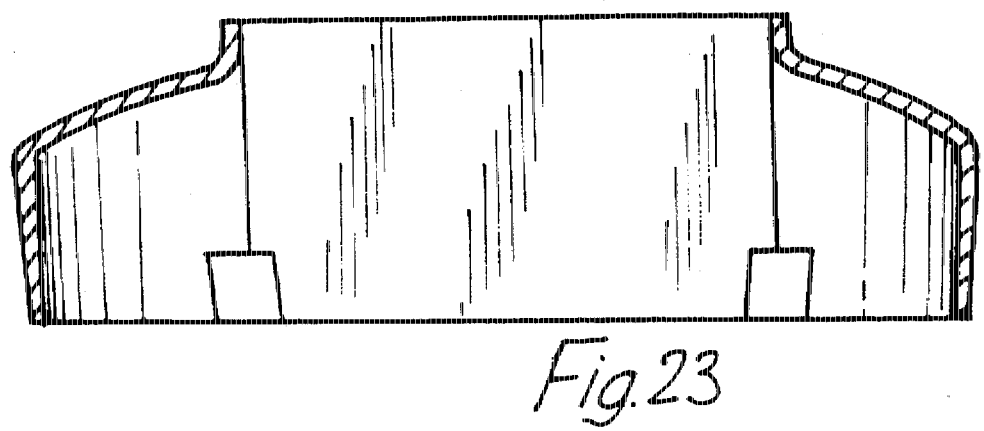
Figure 24:
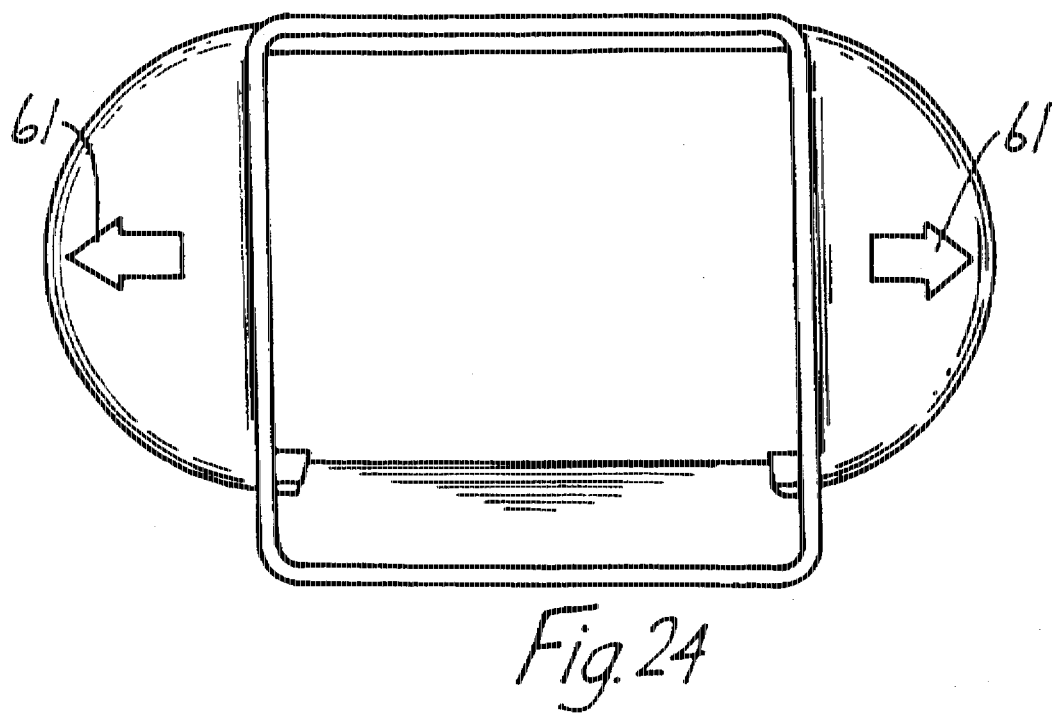
Figure 27:
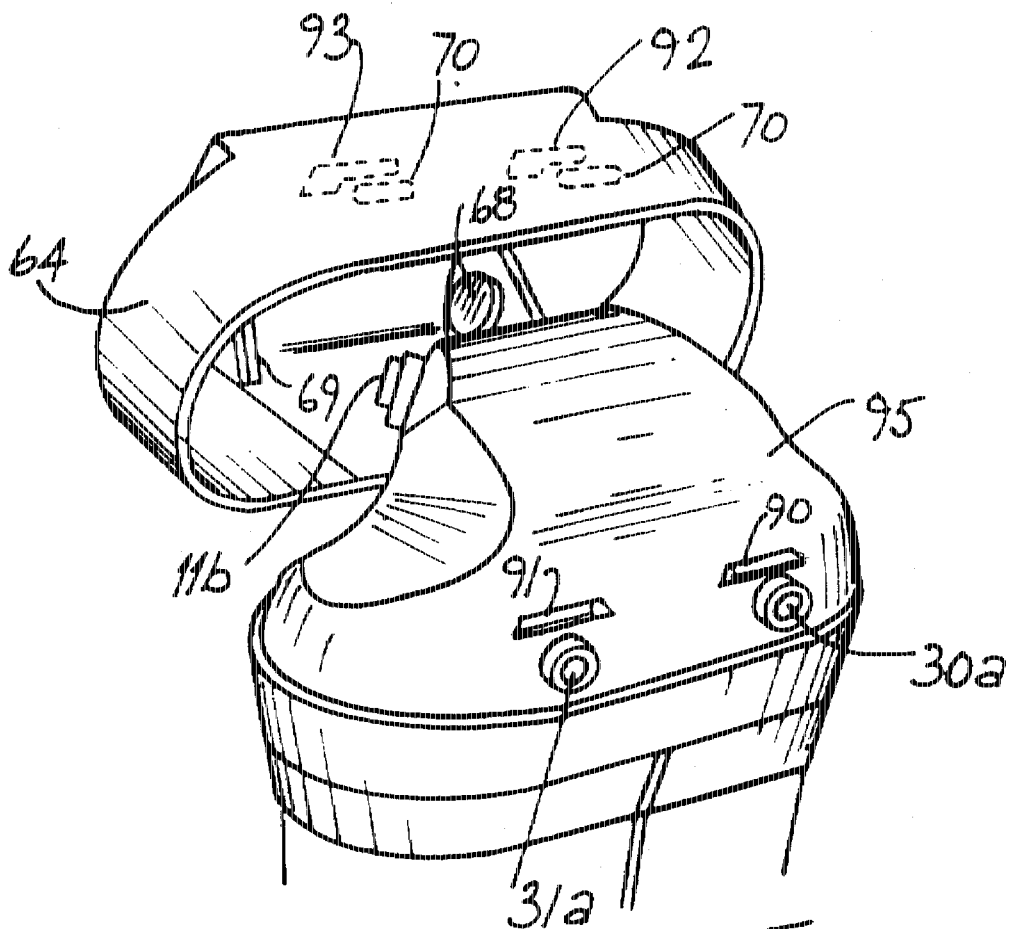
FIGS. 27 to 32 are perspective and side elevational views illustrating the mounting of the closure cap to the main body of the pourer.
Figure 28:
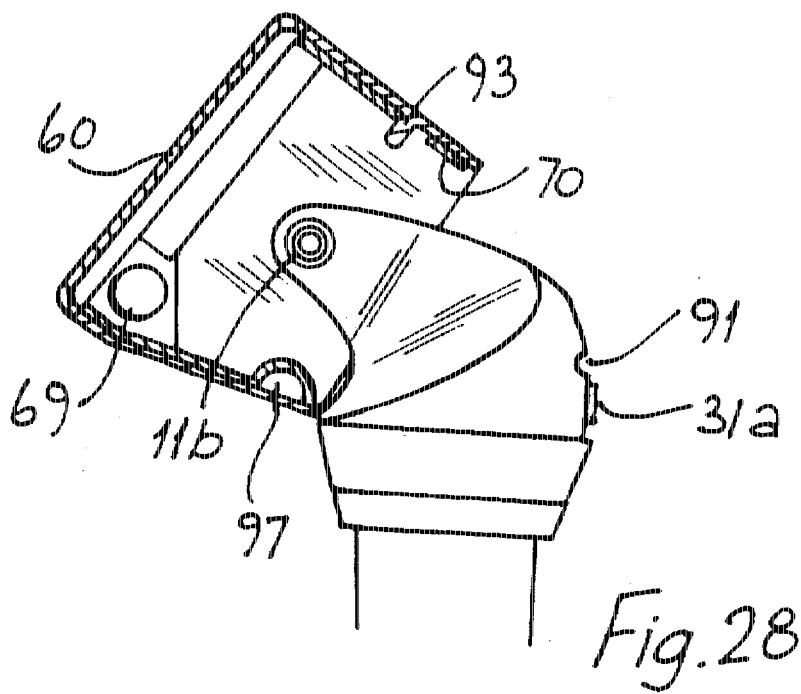
Figure 29:
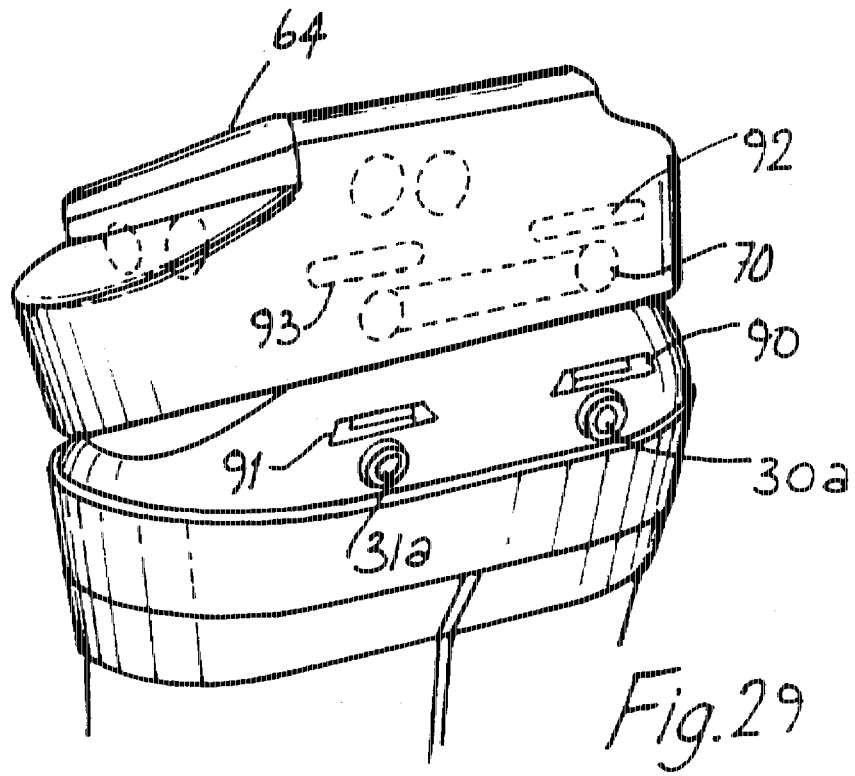
Figure 30:
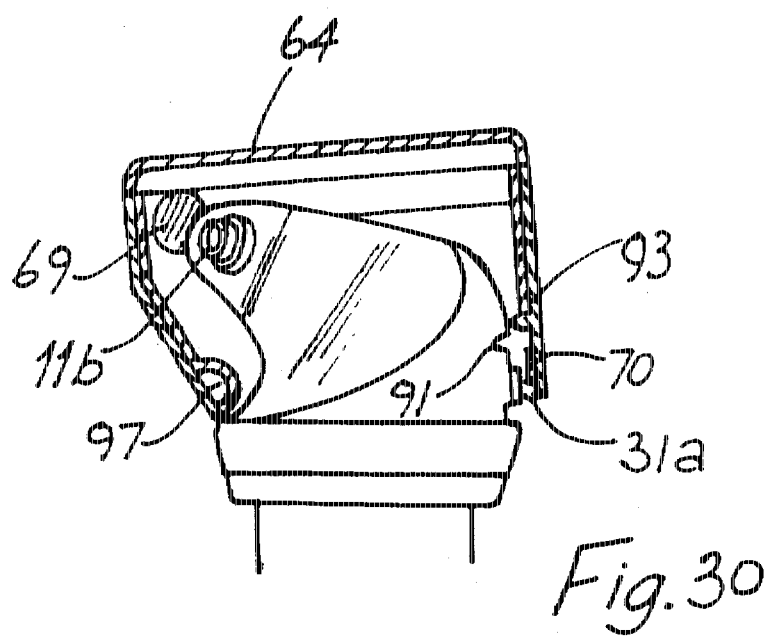
Figure 31:
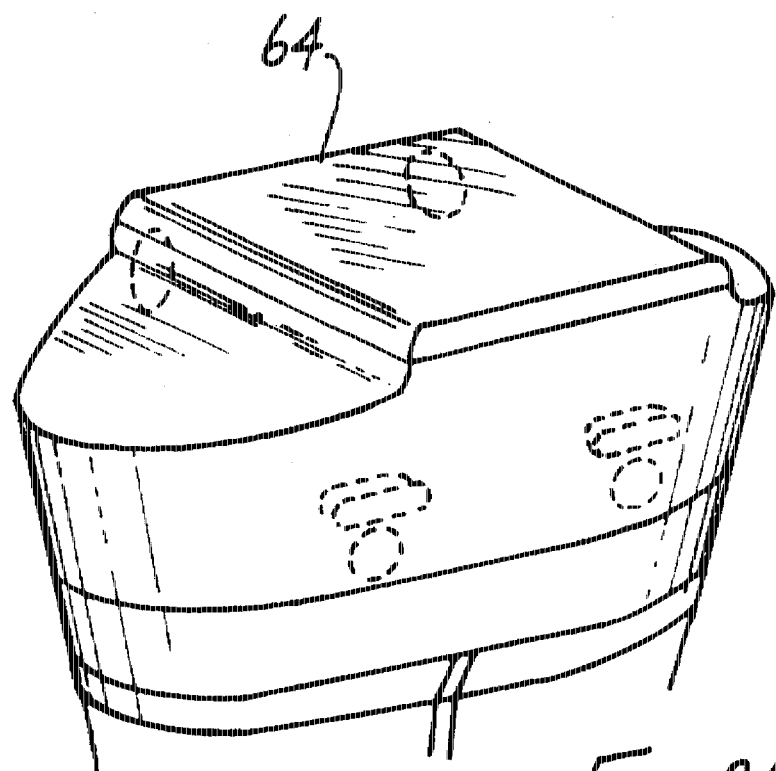
Figure 32:
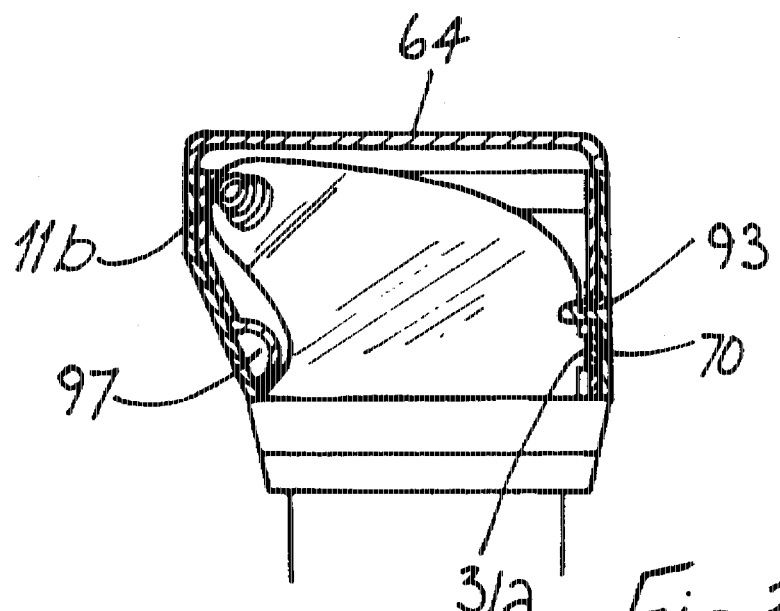

Referring particularly to FIGS. 11A to 11C the angle alpha (FIG. 11A), between, in the front view, the longitudinal axis of the bend portion $11d$, $10d$ of each pouring passageway 10,11 and the horizontal defines how close together the nozzles are for pouring. The angle alpha is preferably from 40° to 80°, most preferably about 60°. This allows the liquids to be poured into a relatively small glass while achieving a good spread of the fluids, on pouring. The angle beta (FIG. 11) between, in the side view, the longitudinal axis of the bend portion $11d,10d$ and the horizontal defines the overall height and projection of the outlet nozzles of the fluid passageways 10,11. This angle beta is preferably from 20° to 60°, most preferably about 40°. This encourages pouring in the correct direction and directing the fluids into a glass. The angle gamma (FIG. 11C) between the longitudinal axis at the outlet $11b,10b$ of each passageway 10,11 and the horizontal effectively inclines the outlet portion $10e,11e$ of the fluid passageways to encourage fluid to drain back down into the containers when pouring is complete. The angle gamma is preferably from 2° to 12°, most preferably, about 8°.

In the case of black coloured liquid, the upstand portion $10c$ promotes suckback of liquid in the pouring passageway 10 into the bottle. In the case of white liquid which is more viscous than the black, the upstand portion $11c$ retards the flow of white liquid so that the black liquid exits its pouring passageway slightly in advance of the white liquid. This assists separation in the receptacle as it allows the black layer to be formed first.

The pourer passageways 10,11 are of different cross-sectional areas for concurrent pouring of the liquids at a predetermined volume ratio. For example, in the case of white and dark liqueurs, the passageways may be designed to pour a volume ratio of the liquids of 2:1. The length of the fluid passageways may also be adjusted to assist in tuning the volume ratio.

Figure 5:
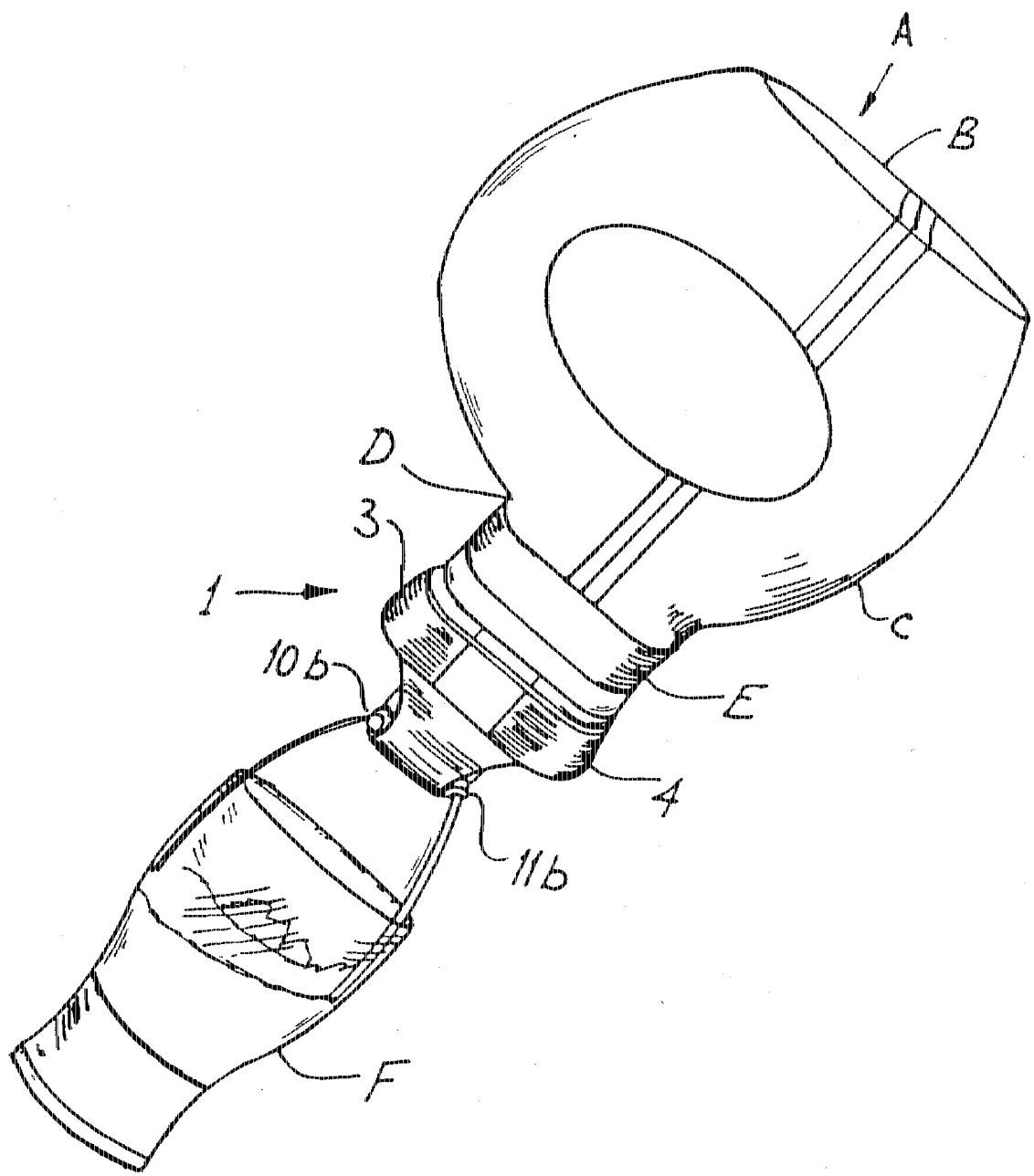
FIG. 5 is a perspective view of the pourer, in use.

The passageways 10, 11 are in this case arranged for substantially concurrent pouring of the liquids from the containers into a receptacle such as a glass F as illustrated in FIG. 5. In this case, the passageways 10, 11 are arranged for substantially concurrent pouring of the liquids to different locations in the glass F. The locations are in this preferred arrangement on opposite sides of the glass F. The angle between the longitudinal axes of the outlets 10b, 11b is at least 90° and preferably, approximately 120° for substantially concurrent pouring of the liquids to the opposite sides of the glass F. This provides particularly good spread of the liquids when poured into a wide glass at a spacing that allows pouring into a smaller glass.

The bore of the liquid passageways 10,11 gradually increases from the outlets towards the inlet. This ensures that, on completion of pouring, any fluid remaining in the bore is encouraged to fall back into the bottle and not form a slug that may block the fluid path. The liquid outlets are also sharp and shaped for drip control. The sealing surface area is reduced. The inside surfaces of the pouring passageways also have smooth profiles to facilitate pouring and prevent slugs of liquid forming on uprighting of bottle.

The main pourer body 2 has separate air passageways 30, 31 associated with each liquid passageway 10, 11, respectively. The air passageways 30, 31 extend from respective air inlet ports 30a, 31a to respective air outlets 30b, 31b. The inlets 30a, 31a are located above the associated fluid outlets 10b, 11b in the pouring position and are offset from the fluid outlets. It will be noted that the air passageways 30,31 extend further in use into the associated containers B,C so that when the bottle is fully tipped, air will continue to come out of the air passageway because of the lower static head in this passageway.

A lower leg 35, 36 extends into a liquid container and an upper leg 37, 38 extends substantially at right angles to the lower leg 35, 36, respectively, so that the air is turned in the air passageways 30, 31 through substantially 90°. The arrangement will be particularly apparent from FIGS. 6 and 11. Each air passageway 30,31 includes a constriction 40 to substantially prevent the flow of fluid through the air passageway while allowing air to flow through the passageway as required, and also preventing the formation of a slug of fluid in the air way.

It will be noted that the air outlets 30b, 31b are defined by scarf portions at the lower end of the legs 35, 36 to facilitate drain-back of any liquid caught in the inner surface of the passageways 30, 31 back into the respective containers.

An air flow management means is provided at the outlet 30b,31b of each air passageway 30,31 to promote the formulation of air bubbles during pouring and to substantially retain air at the outlet 30b,31b on finishing pouring to substantially prevent liquid passing through the air passageways 30,31 when pouring is finished.

In this case the air flow management means comprises an air pot 50 over each outlet 30b,31b of the air passageways 30,31. The outlet 30b,31b of the air passageways 30,31 define, together with the respective air pots 50, an air management volume. In the particular case illustrated we have found that this air management volume is preferably from 1 ml to 3 ml, most preferably approximately 1.6 ml. The volume of air held in the pot 50 means that when a bottle is put upright from a pouring position, and the liquid drains back down the fluid passageway, only air is forced up the air passageway to maintain equilibrium.

The air pot 50 is of a size to allow air and not fluid to be forced up the air tube on finishing pouring. This allows suck-back of fluid down the fluid pipe. The air pot is also of a size to produce large enough air bubbles for even flow of fluid through the fluid pipes.

In this case, the air pot 50 includes a base wall 51, a side wall 52 and a top wall 53. The base 50 and side wall 52 together with the outlet 30b,31b of the air passageway 30,31 define the air management volume.

A location means for receiving the air passageway 30,31 is in this case defined by an entry hole 54 in the top wall 53 through which the air passageway 30,31 extends. The air pot 50 is in this case of plastics material and is ultrasonically welded to the air passageway 30,31 and the upstand portion 10c,11c of the adjacent fluid passageway.

It will be noted that the base wall 51 of the air pot 50 is shaped to provide a lead-in for the pourer on placement on a bottle.

Figure 6:
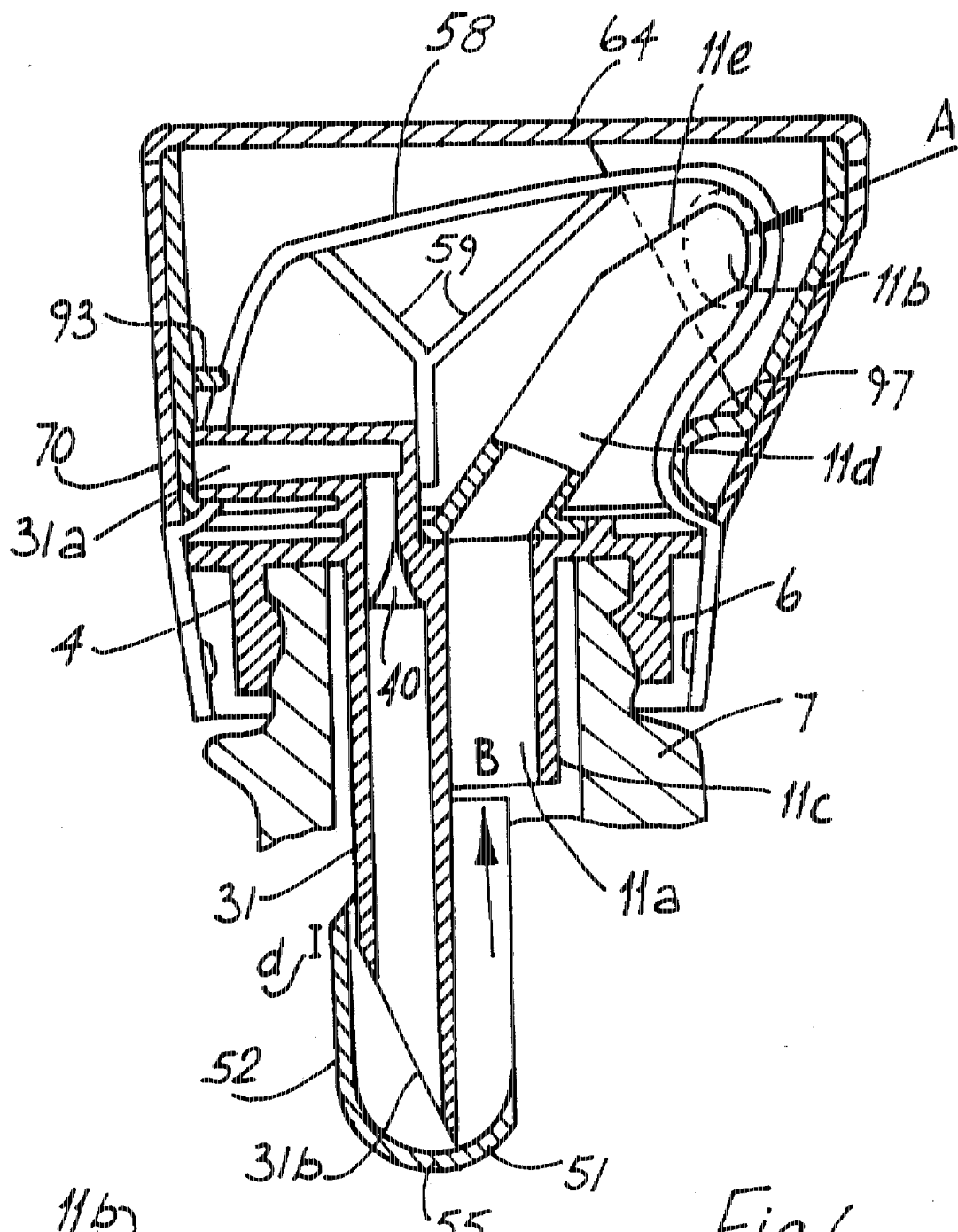
FIG. 6 is a side, cross-sectional view of the pourer.
Figure 7:
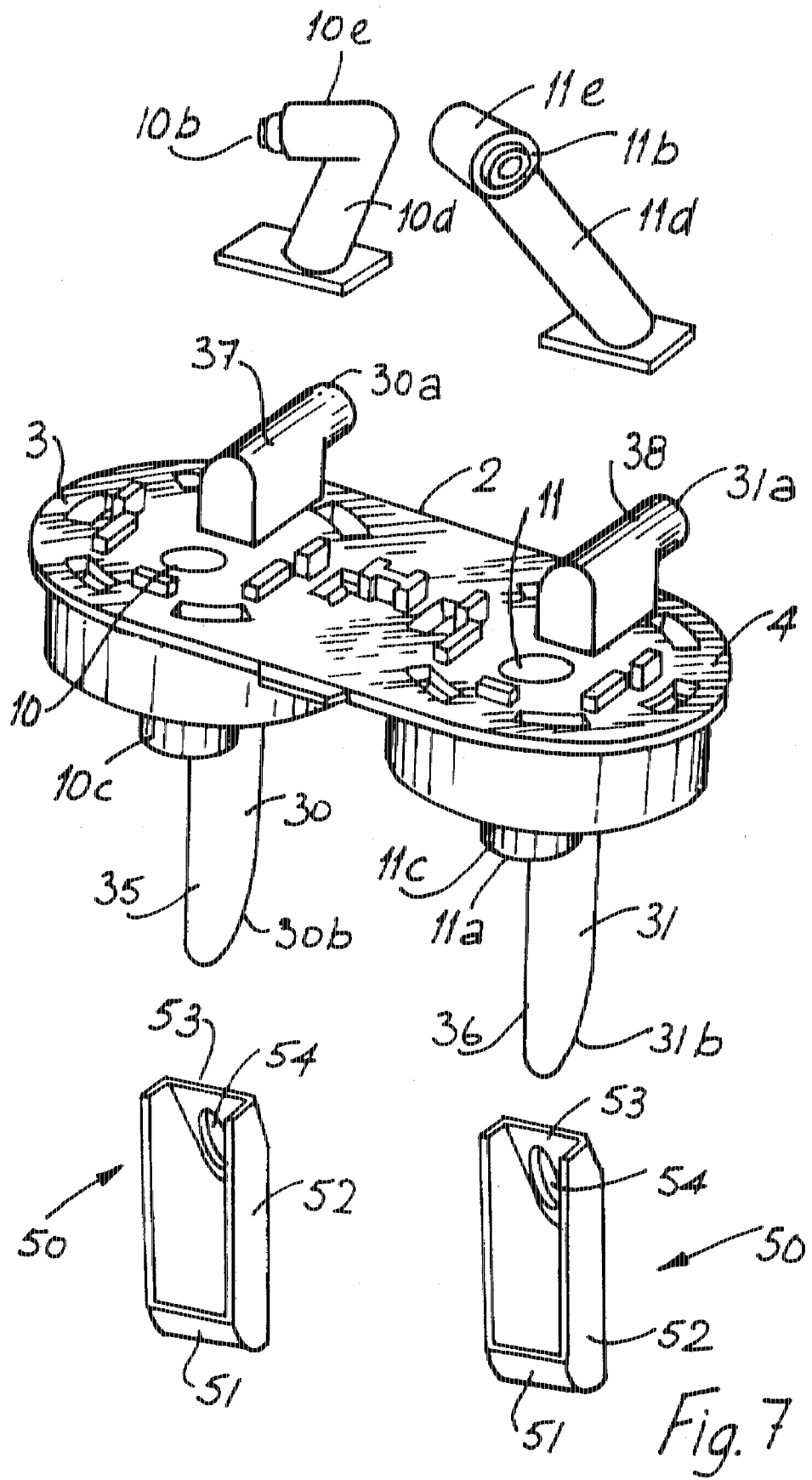
FIG. 7 is an exploded, perspective view from one side of a pourer body assembly.
Figure 8:
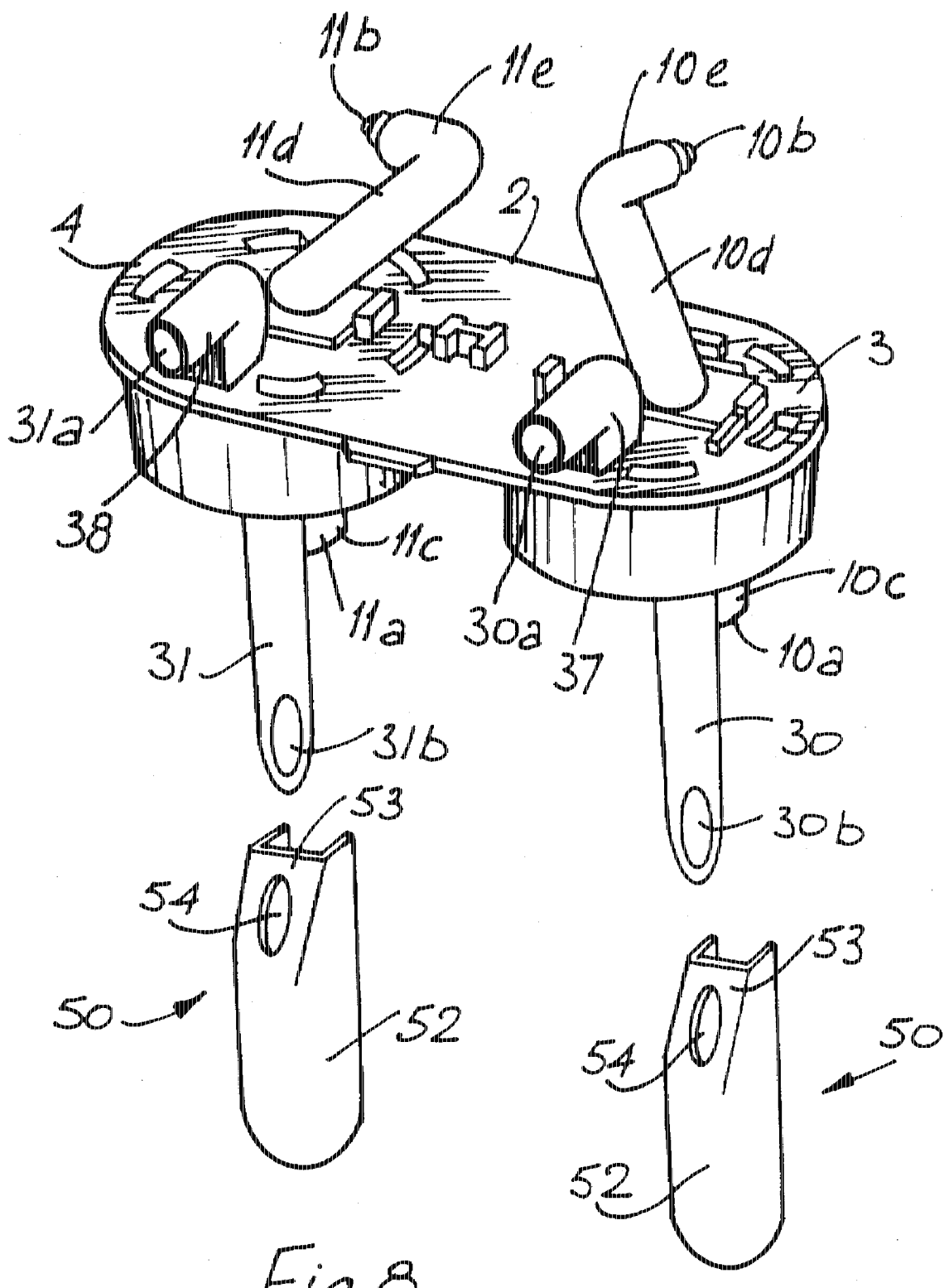
FIG. 8 is a perspective view from an opposite side of the pourer body assembly to FIG. 7 with some parts assembled.
Figure 9:
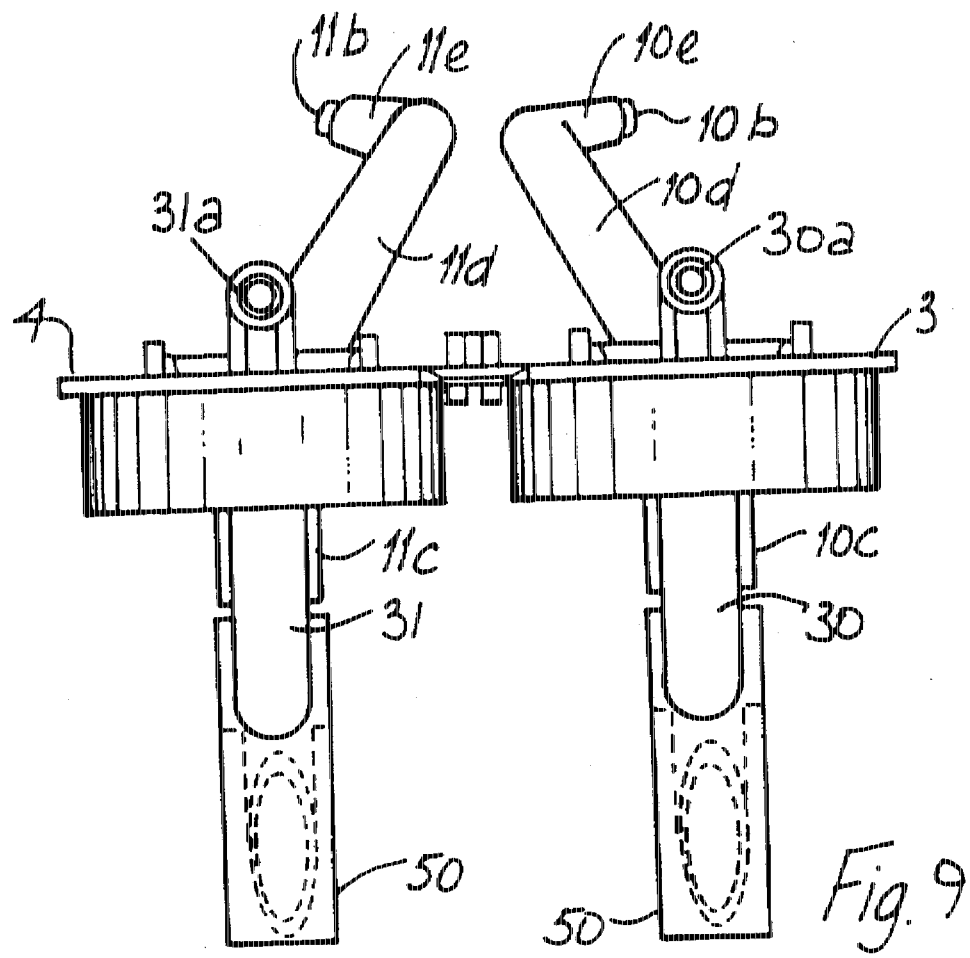
FIG. 9 is a rear elevational view of the pourer body assembly.
Figure 10:
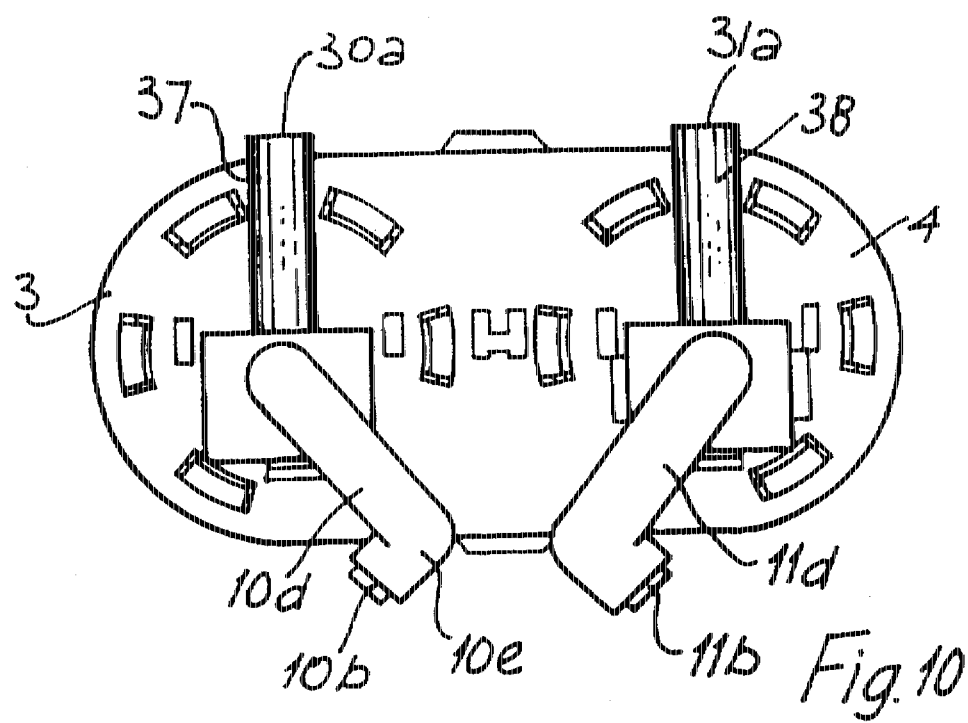
FIG. 10 is a plan view of the pourer body assembly.

Referring particularly to FIG. 6, it will be noted that the pot 50 extends in use for a distance above the upper edge of the scarf 31b. It will be appreciated that the disposition of the air pots 50 relative to the scarfs 31b can be reversed from that illustrated in the drawings. The exit diameter of the pots 50 is important to facilitate the formation of bubbles. If this diameter is too small, surface tension effects may prevent bubble formation.

Each air pot 50 may have a drain hole 55 (FIG. 6) in the base wall 51. The drain hole 55 may be typically about 0.5 mm diameter to allow liquid to drain from the pot 50 when the bottle is upright while avoiding bubbling air when liquid is being poured.

The pourer body illustrated in FIGS. 7 to 11 is covered by two separate cover parts 57, 58 which are shown in detail in FIGS. 12 to 18. The cover parts 57, 58 include reinforcing ribs 59. Inwardly extending projections 60 are provided on one of the cover parts 58 for engagement on assembly in corresponding recesses 61 in lugs 62 carried by the other cover part 57. The cover parts are shown assembled particularly in FIG. 14. Other features of the cover parts 57, 58 are determined by the necessary locations for the fluid outlets and air vents. It will be noted that the cover parts 57,58 define, on assembly, a shape including a recess 63 which assists in indicating to a user the direction of pouring. The cover parts 57, 58 are retained in an assembled configuration by a label top L which interlocks with the cover parts 57, 58 as will be particularly apparent from FIGS. 16 and 20. The table top L is a planar curve to facilitate labelling, for example with pouring instructions.

Referring to FIGS. 19 to 32, a closure cap 64 for the pourer is illustrated in detail. The cap 64 comprises a closure body part 65 and a sealing cap part 66 which is engaged on assembly with the body part 65 as illustrated particularly in FIG. 20.

The cap 64 is arranged to prevent removal of the cap on lifting of the cap. For this reason, the cap is at least partially of flexible material and is a push-on fit to the body of the pourer. In this case, the sidewall means of the cap is pressed inwardly at the locations indicated by the arrows 61 and thumbgrip features 62 (see FIGS. 1 and 3) to release the cap from the pourer. The cap 64 is configured to roll-on to the pourer body on fitting as will be explained in more detail below.

The cap 64 includes separate fluid seals 68, 69 for sealing each of the fluid outlets 10b, 11b, on assembly of the cap to the pourer body. Similarly, the cap includes an air vent seal 70 for sealing each of the air vents 30a, 31a on assembly of the cap to the pourer body.

The cover parts 57, 58 of the pourer body are provided with recesses 90, 91 just above the associated air vents 30a, 31a. The sealing part 66 of the cap 64 is provided with inwardly extending projections 92, 93 which engage in the corresponding recesses 90, 91 on rolling on of the cap to the pourer body as illustrated particularly in FIGS. 26 to 31.

It will be noted that the pourer body includes a ramp part 95 over which the projections 92, 93 on the cap 64 ride on rolling of the cap into the closed position. The ramp 95 defines a lead-in for engaging the projections 92, 93 with the associated recesses 90, 91 and consequently for engaging the air seal 70 with the air vents 30a, 31a. The cap 64 is ramped in the vertical plane to ease the cap over inner edges of the pourer. It is also poured in the horizontal plane to assist in centralising the cap, on fitting.

During rolling-on of the cap 64, it will be apparent that the fluid outlet seals 68, 69 are not rubbed against the pourer body but rather are arranged to engage the fluid outlets 10b, 11b in substantially face-to-face relationship on closure of the cap. The cap also includes a further projection 97 on another face thereof, for engaging with the face of the pourer body opposite from the air vents 30a, 31a. This assists in locating and fixing the cap 64 in position.

To release the cap 64, the sides of the cap 64 are squeezed as indicated by the arrows and thumbgrips. This at least partially releases the projections 92, 93 and 97 from the associated recesses and allows the cap 64 to be rolled-off as illustrated. For re-sealing, the cap 64 is rolled back on to the pourer body and pushed downwardly to the sealing position. In the sealing position, even if the bottle A to which the pourer 1 is fitted is lifted by lifting the cap 64, the cap 64 and pourer 1 will remain in position avoiding accidental breakages and spillages.

The seals 68,69,70 are typically of EVOPRENE™ material having a shore hardness of 50°.

It will be appreciated that the main pourer body may include a receptacle locating means to locate the pourer in a desired pouring position. The receptacle locating means may, for example, comprise a receptacle rim engaging recess in the pourer to guide the user for correct orientation of the pourer for concurrent pouring of liquids into a receptacle. A recess 74 in the cover parts 57, 58 assists in performing this function, an assembly and in use.

Figure 39:
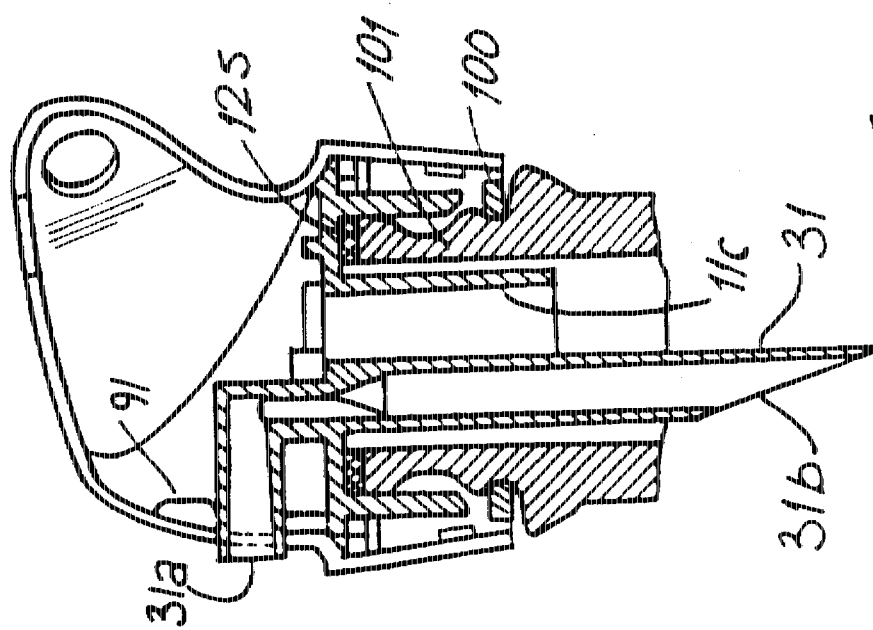
FIG. 39 is a side, partially cross sectional view of the pourer in position on a bottle.
Figure 38:
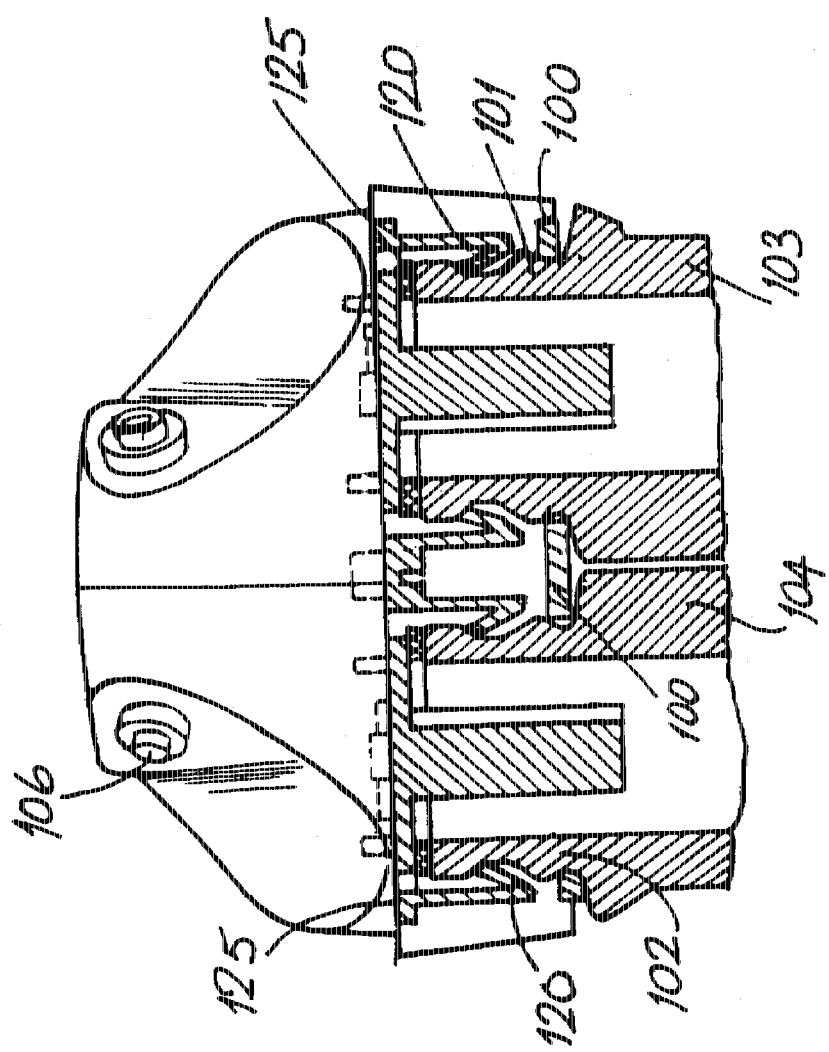
FIG. 38 is a front, partially cross sectional view of the pourer in position on a bottle.

Referring to FIGS. 33 to 36, there is illustrated a jig 100 which may be used in association with the pourer as illustrated in FIGS. 38 and 39. The jig 100 is to align the necks 101, 102 of adjacent bottles 103, 104, on assembly so that the surfaces of the bottle necks 101,102 presented to the pourer are in a common plane, allowing the pourer to be fitted correctly to each bottle 103, 104 and giving substantially constant centre distances between bottles of various size tolerances.

The jig 100 is a single flat piece of plastics material having recesses to receive the respective bottle necks 101, 102. There is a three point contact with a circular recess in each neck 101, 102 by lugs 105 which project into the recesses to contact the bottle necks 101, 102, on assembly. In use, the jig is fitted around the necks 101, 102 of the bottles 103, 104 on adhesive bonding of the bottles and ensures that the bottle necks 101, 102 are maintained in alignment.

A first lug 105a is located substantially on the center line of the container neck and second and third lugs 105b,105C are located on the other side of the container neck. The second and third lugs 105b,105c are equi-angularly spaced from the center line of the container neck.

Figure 37A:
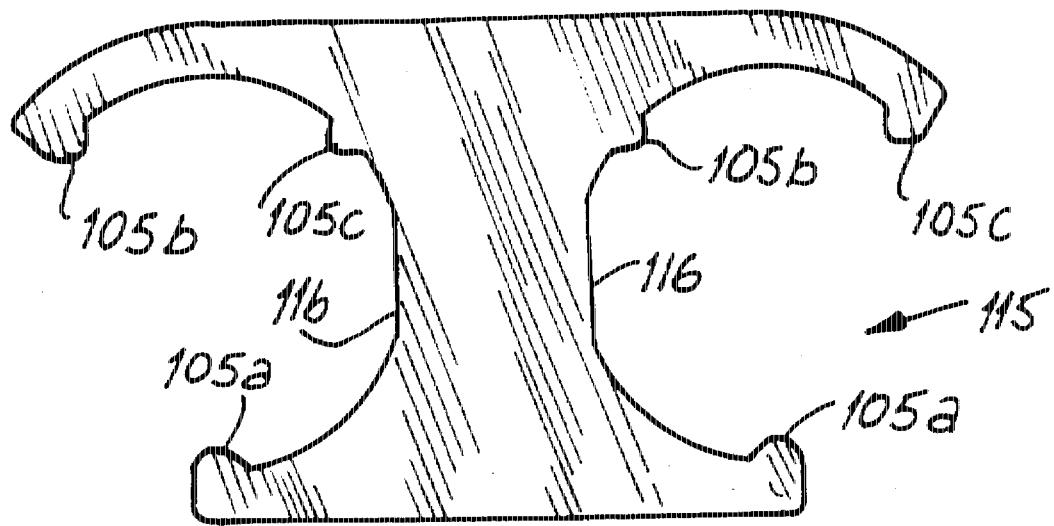
FIG. 37A is a plan view of another bottle jig.
Figure 37B:
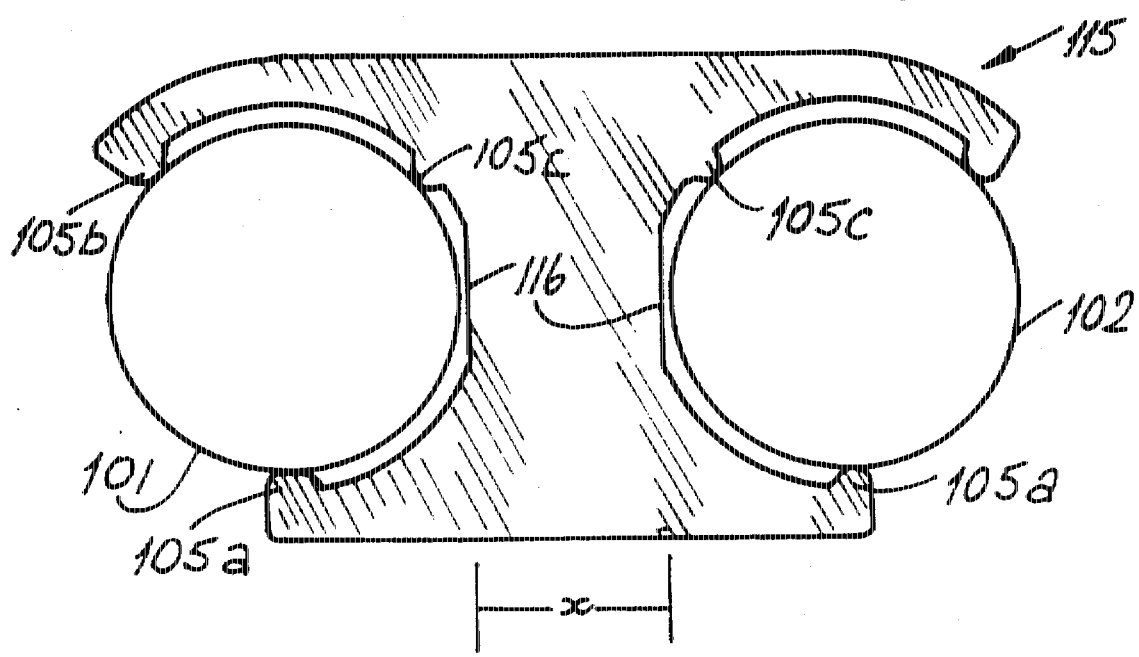
FIG. 37B is a view of the jig of FIG. 37A with a bottle in position.

Referring to FIGS. 37A and 37B, there is illustrated another jig 115 which is similar to the jig of FIGS. 33 to 36 and like parts are assigned the same reference numerals. The design is intended to strengthen the jig 115 thereby preventing the sub-containers being squeezed too tightly during bending. It will be noted that the jig 115 in this case includes flat portions 11b which define stop surfaces to ensure that even if bottles 101,102 are squeezed tightly together, on assembly, there is a minimum spacing X between the bottles 101,102. In this way a pourer may be correctly inserted and the correct sealing obtained.

The main body of the pourer snap-fittingly engages the necks 101, 102 of the bottles 103, 104. Each pourer body section 3, 4 has six equispaced snap projections 120 which ride over enlarged flanges of the bottle necks 101, 102, on fitting of the pourer to the bottles 103, 104. A seal 125 is interposed between each bottle neck 101, 102 and the respective pourer body section. Each seal 125 is of a compressible elastomeric material so that the pourer may be easily push fitted onto the bottle necks 101, 102 without the requirement of a large pushing force. The seal is typically of EVOPRENE™ material having a shore hardness of 27.

Many variations and modifications of the invention will be readily apparent and accordingly the invention is not limited to the embodiments hereinbefore described in their various aspects which may be varied in both construction and detail.

We claim:

1. A pourer for pouring a first liquid from a first container and a second different liquid from a second container, the pourer comprising
   - a first pourer body section for the first container and a second pourer body section for the second container,
   - the first pourer body section having a first air passageway and first liquid pouring passageway, said first liquid pouring passageway having a first liquid discharge outlet with a first liquid pouring axis along which the first liquid is directed, on pouring,
   - the second pouring body section having a second air passageway and a second liquid pouring passageway, said second liquid pouring passageway having a second liquid discharge outlet with a second liquid pouring axis along which the second liquid is directed, on pouring,
   - each of said liquid pouring passageways and air passageways of said two pourer body sections being arranged for substantially concurrent pouring of the two different liquids from the containers,
   - said first and second liquid pouring axis being differently directed for substantially concurrent pouring of diverging streams of the different first and second liquids in different directions to different locations in a receptacle so as to avoid substantial mixing of the first and second liquids.

2. A pourer for pouring at least two different liquids from containers, the pourer comprising
   - two pourer body sections, each of said two pourer body sections having an air passageway and a pouring passageway, said air passageway and said pouring passageway of each of said two pourer body sections being arranged for substantially concurrent pouring of different liquids from containers, and
   - a liquid outlet of said pouring passageway of each of said two pourer body sections having an axis diverging from each other at an angle of at least 90° for substantially concurrent pouring of liquids in different directions onto a side of a receptacle so as to avoid substantial mixing of the liquids.

3. A pourer as claimed in claim 2 wherein said angle between said axes of said liquid outlets is approximately 120°.

4. A pourer as claimed in claim 2 wherein each said air passageway includes a lower leg for extending into a liquid container and an upper leg offset from the lower leg, and the upper leg extends substantially at right angles to the lower leg.

5. A pourer as claimed in claim 2 wherein each said air passageway includes a constriction means to substantially prevent the flow of liquid through the air passageway.

6. A pourer as claimed in claim 2 further comprising receptacle locating means to locate the pourer body sections in a desired pouring position, and the receptacle locating means comprises a receptacle rim engaging a recess in the pourer body sections.

7. A pourer as claimed in claim 2 wherein an angle between a longitudinal axis of an outlet of each pouring passageway and the horizontal is from 2° to 12°.

8. A pourer as claimed in claim 2 wherein the pouring passageway of said two pourer body sections are arranged for concurrent pouring of liquids at a predetermined volume ratio.

9. A pourer as claimed in claim 8 wherein the pouring passageway of said two pourer body sections are of different cross-sectional area for concurrent pouring at a predetermined volume ratio.

10. A pourer as claimed in claim 2 wherein an outlet of the pouring passageway of each of said two pourer body sections is at substantially the same level.

11. A pourer as claimed in claim 10 wherein an air inlet to the air passageway of each of said two pourer body sections is offset from said outlet of said pouring passageway of each of said two pourer body sections.

12. A pourer as claimed in claim 11 wherein each said air inlet is located above the outlet of each said pouring passageway in a pouring position.

13. A pourer as claimed in claim 12 wherein each said air passageway includes an end portion for promoting flow of liquid from an inside surface of each said air passageway back into a container, and the end portion of each said air passageway is a scarf portion.

14. A pourer as claimed in claim 2 wherein an air flow management means is provided at an outlet of each said air passageway to promote the formation of air bubbles during pouring and to substantially retain air at the outlet on finishing pouring to substantially prevent liquid passing through the air passageway on finishing pouring.

15. A pourer as claimed in claim 14 wherein the air flow management means comprises an air pot over the outlet of the air passageway, and the outlet of the air passageway defines, together with the air pot, an air management volume.

16. A pourer as claimed in claim 15 wherein the air pot includes a base wall and a side wall which extends upwardly from he base wall, at least one of the base and the side wall defining together with the outlet of the air passageway, the air management volume, and the air pot includes location means for receiving the air passageway, the location means comprises an entry hole in a top wall of the air pot through which the air passageway extends.

17. A pourer as claimed in claim 15 wherein the air management volume is from 1 ml to 3 ml.

18. A pourer as claimed in claim 15 wherein the air pot includes a drain hole to allow liquid to drain from the pot, and the air pot is shaped to provide a lead-in for the pourer on placement on a container.

19. A pourer as claimed in claim 2 wherein each pouring passageway includes an upstand portion which extends from the pourer body section for extension into a container.

20. A pourer as claimed in claim 19 wherein each pouring passageway includes an upper bend portion extending from the upstand portion to an outlet portion.

21. A pourer as claimed in claim 20 wherein the upstand portion is generally elliptical in cross section to provide a smooth transition between the upstand and bend portions.

22. A pourer as claimed in claim 20 wherein an angle between a longitudinal axis of the upper bend portion of each pouring passageway and the horizontal is from 40° to 80°.

23. A pourer as claimed in claim 22 wherein an angle between the longitudinal axis of the upper bend portion of each pouring passageway and the horizontal is from 20° to 60°.

24. A pourer as claimed in claim 2 wherein a bore of each pouring passageway gradually increases from a liquid outlet towards a liquid inlet.

25. A pourer as claimed in claim 24 wherein the pourer body sections include a cover for each liquid outlet.

26. A pourer as claimed in claim 25 wherein said cover includes a sealing cap.

27. A pourer as claimed in claim 26 wherein the sealing cap includes a fluid seal for sealing each liquid outlet, and the sealing cap includes an air seal for sealing each air passageway.

28. A pourer as claimed in claim 26 wherein the sealing cap is configured to roll-on to the two pourer body sections, and a fluid seal engages with the liquid outlet on rolling of the sealing cap into position on the two pourer body sections.

29. A pourer as claimed in claim 26 wherein one of the sealing cap and pourer body sections includes a projection for engaging with a complementary recess on the other of the pourer body sections and the sealing cap when the sealing cap is moved to a closed position.

30. A pourer as claimed in claim 26 wherein the sealing cap is arranged on said two pourer body sections to prevent removal of the sealing cap on lifting of the sealing cap.

31. A pourer as claimed in claim 30 wherein the sealing cap is at least partially of flexible material and is a push-on fit to the two pourer body sections, and a sidewall of the sealing cap is pressed inwardly to release the sealing cap from the pourer body sections.

32. A pourer as claimed in claim 26 wherein the two pourer body sections include a ramp over which the sealing cap rides on rolling into a closed position.

33. A pourer as claimed in claim 32 wherein the ramp defines a lead-in for engaging an air seal with the air passageway on movement of the sealing cap into the closed position.

34. A bottle having at least two separate containers for different liquids and having a pourer, in combination, said pourer comprising two pourer body sections, each of said two pourer body sections having an air passageway and a pouring passageway, said air passageway and said pouring passageway of each of said two pourer body sections being arranged for substantially concurrent pouring of different liquids from containers, and a liquid outlet of said pouring passageway of each of said two pourer body sections having an axis diverging from each other at an angle of at least 90° for substantially concurrent pouring of liquids in different directions onto a side of a receptacle so as to avoid substantial mixing of the liquids.

35. The combination as claimed in claim 34 wherein the bottle and pourer are integral.

36. The combination as claimed in claim 34 wherein each container has a neck and the pourer is fitted to the necks of the containers.

37. The combination as claimed in claim 36 wherein each pourer body section includes snap projections to snap fittingly engage a corresponding formation on the container neck, and a seal is interposed between each pourer body section and the associated container, and the seal is of a compressible elastomeric material.

38. The combination as claimed in claim 36 further including a jig to align the necks of adjacent containers on assembly of the containers so that surfaces of the container necks presented to the pourer are substantially in a common plane.

39. The combination as claimed in claim 38 wherein the jig includes recesses to receive the respective container necks, the jig having lugs which project into the recesses to contact the respective container necks, and three lugs are associated with each recess to define a three point contact with a respective container neck, a first lug located substantially on a center line of the container neck and a second and third lug are located on the other side of the container neck, the second and third lugs being equi-angularly spaced from the center line of the container neck.

* * * * *